US012228150B2

(12) United States Patent
Cooper et al.

(10) Patent No.: US 12,228,150 B2
(45) Date of Patent: Feb. 18, 2025

(54) MOLTEN METAL TRANSFER DEVICE

(71) Applicant: Molten Metal Equipment Innovations, LLC, Middlefield, OH (US)

(72) Inventors: Paul V. Cooper, Chesterland, OH (US); Vince Fontana, Middlefield, OH (US)

(73) Assignee: Molten Metal Equipment Innovations, LLC

(*) Notice: Subject to any disclaimer, the term of this patent is extended or adjusted under 35 U.S.C. 154(b) by 0 days.

(21) Appl. No.: 18/529,875

(22) Filed: Dec. 5, 2023

(65) Prior Publication Data

US 2024/0102474 A1 Mar. 28, 2024

Related U.S. Application Data

(63) Continuation of application No. 17/334,259, filed on May 28, 2021, now Pat. No. 11,873,845.

(51) Int. Cl.

| | |
|---|---|
| ***F04D 29/42*** | (2006.01) |
| ***F04D 7/06*** | (2006.01) |
| *F27D 3/00* | (2006.01) |
| *F27D 3/14* | (2006.01) |
| *F27D 27/00* | (2010.01) |

(52) U.S. Cl.

CPC ......... *F04D 7/065* (2013.01); *F04D 29/4293* (2013.01); *F27D 2003/0054* (2013.01); *F27D 2003/0055* (2013.01); *F27D 3/14* (2013.01); *F27D 2027/002* (2013.01); *F27D 27/005* (2013.01)

(58) Field of Classification Search

CPC ........ F04D 7/065; F04D 29/4293; F27D 3/14; F27D 27/005; F27D 2003/0054; F27D 2003/0055

See application file for complete search history.

(56) References Cited

U.S. PATENT DOCUMENTS

| | | | |
|---|---|---|---|
| 35,604 | A | 6/1862 | Guild |
| 116,797 | A | 7/1871 | Barnhart |
| 209,219 | A | 10/1878 | Bookwalter |
| 251,104 | A | 12/1881 | Finch |
| 307,845 | A | 11/1884 | Curtis |
| 364,804 | A | 6/1887 | Cole |
| 390,319 | A | 10/1888 | Thomson |

(Continued)

FOREIGN PATENT DOCUMENTS

| | | |
|---|---|---|
| GB | 161707 A | 4/1921 |

*Primary Examiner* — Courtney D Heinle
*Assistant Examiner* — Andrew J Marien
(74) *Attorney, Agent, or Firm* — SNELL & WILMER L.L.P.

(57) ABSTRACT

A device includes a molten metal pump and a metal-transfer conduit. A clamp may be used to attach the metal-transfer conduit to the pump. The pump has a pump base including an indentation configured to receive the metal-transfer conduit and align the pump outlet with the transfer inlet. The pump outlet may be formed in the indentation and preferably near the center of the indentation in order to better align with the transfer inlet. As the pump operates it moves molten metal through a pump outlet that is in communication with a transfer inlet in the metal-transfer conduit. The molten metal enters the transfer inlet, moves upwards in a passage in the metal-transfer conduit, and out of a transfer outlet.

20 Claims, 20 Drawing Sheets

(56) References Cited

U.S. PATENT DOCUMENTS 495,760 A 4/1893 Seitz
506,572 A 10/1893 Wagener
585,188 A 6/1897 Davis
757,932 A 4/1904 Jones
882,477 A 3/1908 Neumann
882,478 A 3/1908 Neumann
890,319 A 6/1908 Wells
898,499 A 9/1908 O'Donnell
909,774 A 1/1909 Flora
919,194 A 4/1909 Livingston
1,037,659 A 9/1912 Rembert
1,100,475 A 6/1914 Franckaerts
1,170,512 A 2/1916 Chapman
1,196,758 A 9/1916 Blair
1,304,068 A 5/1919 Krogh
1,331,997 A 2/1920 Neal
1,185,314 A 3/1920 London
1,377,101 A 5/1921 Sparling
1,380,798 A 6/1921 Hansen et al.
1,439,365 A 12/1922 Hazell
1,454,967 A 5/1923 Gill
1,470,607 A 10/1923 Hazell
1,513,875 A 11/1924 Wilke
1,518,501 A 12/1924 Gill
1,522,765 A 1/1925 Wilke
1,526,851 A 2/1925 Hall
1,669,668 A 5/1928 Marshall
1,673,594 A 6/1928 Schmidt
1,697,202 A 1/1929 Nagle
1,717,969 A 6/1929 Goodner
1,718,396 A 6/1929 Wheeler
1,896,201 A 2/1933 Sterner-Rainer
1,988,875 A 1/1935 Saborio
2,013,455 A 9/1935 Baxter
2,035,282 A 3/1936 Schmeller, Sr.
2,038,221 A 4/1936 Kagi
2,075,633 A 3/1937 Anderegg
2,090,162 A 8/1937 Tighe
2,091,677 A 8/1937 Fredericks
2,138,814 A 12/1938 Bressler
2,173,377 A 9/1939 Schultz, Jr. et al.
2,264,740 A 12/1941 Brown
2,280,979 A 4/1942 Rocke
2,290,961 A 7/1942 Heuer
2,300,688 A 11/1942 Nagle
2,304,849 A 12/1942 Ruthman
2,368,962 A 2/1945 Blom
2,383,424 A 8/1945 Stepanoff
2,423,655 A 7/1947 Mars et al.
2,488,447 A 11/1949 Tangen et al.
2,493,467 A 1/1950 Sunnen
2,515,097 A 7/1950 Schryber
2,515,478 A 7/1950 Tooley et al.
2,528,208 A 10/1950 Bonsack et al.
2,528,210 A 10/1950 Stewart
2,543,633 A 2/1951 Lamphere
2,566,892 A 4/1951 Jacobs
2,625,720 A 1/1953 Ross
2,626,086 A 1/1953 Forrest
2,676,279 A 4/1954 Wilson
2,677,609 A 4/1954 Moore et al.
2,698,583 A 1/1955 House et al.
2,714,354 A 8/1955 Farrand
2,762,095 A 9/1956 Pemetzrieder
2,768,587 A 10/1956 Corneil
2,775,348 A 12/1956 Williams
2,779,574 A 1/1957 Schneider
2,787,873 A 4/1957 Hadley
2,808,782 A 10/1957 Thompson et al.
2,809,107 A 10/1957 Russell
2,821,472 A 1/1958 Peterson et al.
2,824,520 A 2/1958 Bartels
2,832,292 A 4/1958 Edwards
2,839,006 A 6/1958 Mayo
2,853,019 A 9/1958 Thornton
2,865,295 A 12/1958 Nikolaus
2,865,618 A 12/1958 Abell
2,868,132 A 1/1959 Rittershofer
2,901,006 A 8/1959 Andrews
2,901,677 A 8/1959 Chessman et al.
2,906,632 A 9/1959 Nickerson
2,918,876 A 12/1959 Howe
2,948,524 A 8/1960 Sweeney et al.
2,958,293 A 11/1960 Pray, Jr.
2,966,345 A 12/1960 Burgoon et al.
2,966,381 A 12/1960 Menzel
2,978,885 A 4/1961 Davison
2,984,524 A 5/1961 Franzen
2,987,885 A 6/1961 Hodge
3,010,402 A 11/1961 King
3,015,190 A 1/1962 Arbeit
3,039,864 A 6/1962 Hess
3,044,408 A 7/1962 Mellott
3,048,384 A 8/1962 Sweeney et al.
3,070,393 A 12/1962 Silverberg et al.
3,092,030 A 6/1963 Wunder
3,099,870 A 8/1963 Seeler
3,128,327 A 4/1964 Upton
3,130,678 A 4/1964 Chenault
3,130,679 A 4/1964 Sence
3,151,565 A 10/1964 Albertson et al.
3,171,357 A 3/1965 Egger
3,172,850 A 3/1965 Englesberg et al.
3,203,182 A 8/1965 Pohl
3,227,547 A 1/1966 Szekely
3,244,109 A 4/1966 Barske
3,251,676 A 5/1966 Johnson
3,255,702 A 6/1966 Gehrm
3,258,283 A 6/1966 Winberg et al.
3,272,619 A 9/1966 Sweeney et al.
3,289,473 A 12/1966 Louda
3,291,473 A 12/1966 Sweeney et al.
3,368,805 A 2/1968 Davey et al.
3,374,943 A 3/1968 Cervenka
3,400,923 A 9/1968 Howie et al.
3,417,929 A 12/1968 Secrest et al.
3,432,336 A 3/1969 Langrod et al.
3,459,133 A 8/1969 Scheffler
3,459,346 A 8/1969 Tinnes
3,477,383 A 11/1969 Rawson et al.
3,487,805 A 1/1970 Satterthwaite
3,512,762 A 5/1970 Umbricht
3,512,788 A 5/1970 Kilbane
3,532,445 A 10/1970 Scheffler et al.
3,561,885 A 2/1971 Lake
3,575,525 A 4/1971 Fox et al.
3,581,767 A 6/1971 Jackson
3,612,715 A 10/1971 Yedidiah
3,618,917 A 11/1971 Fredrikson et al.
3,620,716 A 11/1971 Hess
3,650,730 A 3/1972 Derham et al.
3,689,048 A 9/1972 Foulard et al.
3,715,112 A 2/1973 Carbonnel
3,732,032 A 5/1973 Daneel
3,737,304 A 6/1973 Blayden et al.
3,737,305 A 6/1973 Blayden et al.
3,743,263 A 7/1973 Szekely
3,743,500 A 7/1973 Foulard et al.
3,753,690 A 8/1973 Emley et al.
3,759,628 A 9/1973 Kempf
3,759,635 A 9/1973 Carter et al.
3,767,382 A 10/1973 Bruno et al.
3,776,660 A 12/1973 Anderson et al.
3,785,632 A 1/1974 Kraemer et al.
3,787,143 A 1/1974 Carbonnel et al.
3,799,522 A 3/1974 Brant et al.
3,799,523 A 3/1974 Seki
3,807,708 A 4/1974 Jones
3,814,400 A 6/1974 Seki
3,824,028 A 7/1974 Zenkner et al.
3,824,042 A 7/1974 Barnes et al.
3,836,280 A 9/1974 Koch
3,839,019 A 10/1974 Bruno et al.
3,844,972 A 10/1974 Tully, Jr. et al.

(56) References Cited

U.S. PATENT DOCUMENTS

| | | | |
|---|---|---|---|
| 3,871,872 | A | 3/1975 | Downing et al. |
| 3,873,073 | A | 3/1975 | Baum et al. |
| 3,873,305 | A | 3/1975 | Claxton et al. |
| 3,881,039 | A | 4/1975 | Baldieri et al. |
| 3,886,992 | A | 6/1975 | Maas et al. |
| 3,915,594 | A | 10/1975 | Nesseth |
| 3,915,694 | A | 10/1975 | Ando |
| 3,935,003 | A | 1/1976 | Steinke et al. |
| 3,941,588 | A | 3/1976 | Dremann |
| 3,941,589 | A | 3/1976 | Norman et al. |
| 3,942,473 | A | 3/1976 | Chodash |
| 3,954,134 | A | 5/1976 | Maas et al. |
| 3,958,979 | A | 5/1976 | Valdo |
| 3,958,981 | A | 5/1976 | Forberg et al. |
| 3,961,778 | A | 6/1976 | Carbonnel et al. |
| 3,966,456 | A | 6/1976 | Ellenbaum et al. |
| 3,967,286 | A | 6/1976 | Andersson et al. |
| 3,972,709 | A | 8/1976 | Chin et al. |
| 3,973,871 | A | 8/1976 | Hance |
| 3,984,234 | A | 10/1976 | Claxton et al. |
| 3,985,000 | A | 10/1976 | Hartz |
| 3,997,336 | A | 12/1976 | van Linden et al. |
| 4,003,560 | A | 1/1977 | Carbonnel |
| 4,008,884 | A | 2/1977 | Fitzpatrick et al. |
| 4,018,598 | A | 4/1977 | Markus |
| 4,043,146 | A | 8/1977 | Stegherr et al. |
| 4,052,199 | A | 10/1977 | Mangalick |
| 4,055,390 | A | 10/1977 | Young |
| 4,063,849 | A | 12/1977 | Modianos |
| 4,068,965 | A | 1/1978 | Lichti |
| 4,073,606 | A | 2/1978 | Eller |
| 4,091,970 | A | 5/1978 | Komiyama et al. |
| 4,119,141 | A | 10/1978 | Thut et al. |
| 4,125,146 | A | 11/1978 | Muller |
| 4,126,360 | A | 11/1978 | Miller et al. |
| 4,128,415 | A | 12/1978 | van Linden et al. |
| 4,147,474 | A | 4/1979 | Heimdal et al. |
| 4,169,584 | A | 10/1979 | Mangalick |
| 4,191,486 | A | 3/1980 | Pelton |
| 4,213,742 | A | 7/1980 | Henshaw |
| 4,242,039 | A | 12/1980 | Villard et al. |
| 4,244,423 | A | 1/1981 | Thut et al. |
| 4,286,985 | A | 9/1981 | Van Linden et al. |
| 4,305,214 | A | 12/1981 | Hurst |
| 4,322,245 | A | 3/1982 | Claxton |
| 4,338,062 | A | 7/1982 | Neal |
| 4,347,041 | A | 8/1982 | Cooper |
| 4,351,514 | A | 9/1982 | Koch |
| 4,355,789 | A | 10/1982 | Dolzhenkov et al. |
| 4,356,940 | A | 11/1982 | Ansorge |
| 4,360,314 | A | 11/1982 | Pennell |
| 4,370,096 | A | 1/1983 | Church |
| 4,372,541 | A | 2/1983 | Bocourt et al. |
| 4,375,937 | A | 3/1983 | Cooper |
| 4,389,159 | A | 6/1983 | Sarvanne |
| 4,392,888 | A | 7/1983 | Eckert et al. |
| 4,410,299 | A | 10/1983 | Shimoyama |
| 4,419,049 | A | 12/1983 | Gerboth et al. |
| 4,456,424 | A | 6/1984 | Araoka |
| 4,470,846 | A | 9/1984 | Dube |
| 4,474,315 | A | 10/1984 | Gilbert et al. |
| 4,496,393 | A | 1/1985 | Lustenberger |
| 4,504,392 | A | 3/1985 | Groteke |
| 4,509,979 | A | 4/1985 | Bauer |
| 4,530,641 | A | 7/1985 | Gschwender |
| 4,537,624 | A | 8/1985 | Tenhover et al. |
| 4,537,625 | A | 8/1985 | Tenhover et al. |
| 4,545,887 | A | 10/1985 | Arnesen |
| 4,556,419 | A | 12/1985 | Otsuka et al. |
| 4,557,766 | A | 12/1985 | Tenhover et al. |
| 4,586,845 | A | 5/1986 | Morris |
| 4,592,700 | A | 6/1986 | Toguchi et al. |
| 4,594,052 | A | 6/1986 | Niskanen |
| 4,596,510 | A | 6/1986 | Arneth et al. |
| 4,598,899 | A | 7/1986 | Cooper |
| 4,600,222 | A | 7/1986 | Appling |
| 4,607,825 | A | 8/1986 | Briolle et al. |
| 4,609,442 | A | 9/1986 | Tenhover et al. |
| 4,611,790 | A | 9/1986 | Otsuka et al. |
| 4,617,232 | A | 10/1986 | Chandler et al. |
| 4,634,105 | A | 1/1987 | Withers et al. |
| 4,640,666 | A | 2/1987 | Sodergard |
| 4,655,610 | A | 4/1987 | Al-Jaroudi |
| 4,668,166 | A | 5/1987 | Lutz |
| 4,669,953 | A | 6/1987 | Gechwender |
| 4,673,434 | A | 6/1987 | Withers et al. |
| 4,682,585 | A | 7/1987 | Hiltebrandt |
| 4,684,281 | A | 8/1987 | Patterson |
| 4,685,822 | A | 8/1987 | Pelton |
| 4,696,703 | A | 9/1987 | Henderson et al. |
| 4,701,226 | A | 10/1987 | Henderson et al. |
| 4,702,768 | A | 10/1987 | Areauz et al. |
| 4,714,371 | A | 12/1987 | Cuse |
| 4,717,540 | A | 1/1988 | McRae et al. |
| 4,739,974 | A | 4/1988 | Mordue |
| 4,741,664 | A | 5/1988 | Olmstead |
| 4,743,428 | A | 5/1988 | McRae et al. |
| 4,747,583 | A | 5/1988 | Gordon et al. |
| 4,767,230 | A | 8/1988 | Leas, Jr. |
| 4,770,701 | A | 9/1988 | Henderson et al. |
| 4,786,230 | A | 11/1988 | Thut |
| 4,802,656 | A | 2/1989 | Hudault et al. |
| 4,804,168 | A | 2/1989 | Otsuka et al. |
| 4,810,314 | A | 3/1989 | Henderson et al. |
| 4,822,473 | A | 4/1989 | Arnesen |
| 4,834,573 | A | 5/1989 | Asano et al. |
| 4,842,227 | A | 6/1989 | Harrington et al. |
| 4,844,425 | A | 7/1989 | Piras et al. |
| 4,851,296 | A | 7/1989 | Tenhover et al. |
| 4,854,834 | A | 8/1989 | Gschwender et al. |
| 4,859,413 | A | 8/1989 | Harris et al. |
| 4,860,819 | A | 8/1989 | Moscoe et al. |
| 4,867,638 | A | 9/1989 | Handtmann et al. |
| 4,884,786 | A | 12/1989 | Gillespie |
| 4,898,367 | A | 2/1990 | Cooper |
| 4,908,060 | A | 3/1990 | Duenkelmann |
| 4,909,704 | A | 3/1990 | Lutz |
| 4,911,726 | A | 3/1990 | Warkentin |
| 4,923,770 | A | 5/1990 | Grasselli et al. |
| 4,930,986 | A | 6/1990 | Cooper |
| 4,931,091 | A | 6/1990 | Waite et al. |
| 4,940,214 | A | 7/1990 | Gillespie |
| 4,940,384 | A | 7/1990 | Amra et al. |
| 4,954,167 | A | 9/1990 | Cooper |
| 4,967,827 | A | 11/1990 | Campbell |
| 4,973,433 | A | 11/1990 | Gilbert et al. |
| 4,986,736 | A | 1/1991 | Kajiwara et al. |
| 4,989,736 | A | 2/1991 | Andersson et al. |
| 5,000,025 | A | 3/1991 | Beekel |
| 5,015,518 | A | 5/1991 | Sasaki et al. |
| 5,025,198 | A | 6/1991 | Mordue et al. |
| 5,028,211 | A | 7/1991 | Mordue et al. |
| 5,029,821 | A | 7/1991 | Bar-on et al. |
| 5,058,654 | A | 10/1991 | Simmons |
| 5,078,572 | A | 1/1992 | Amra et al. |
| 5,080,715 | A | 1/1992 | Provencher et al. |
| 5,083,753 | A | 1/1992 | Soofi |
| 5,088,893 | A | 2/1992 | Gilbert et al. |
| 5,092,821 | A | 3/1992 | Gilbert et al. |
| 5,098,134 | A | 3/1992 | Monckton |
| 5,099,554 | A | 3/1992 | Cooper |
| 5,114,312 | A | 5/1992 | Stanislao |
| 5,126,047 | A | 6/1992 | Martin et al. |
| 5,131,632 | A | 7/1992 | Olson |
| 5,135,202 | A | 8/1992 | Yamashita et al. |
| 5,143,357 | A | 9/1992 | Gilbert et al. |
| 5,145,322 | A | 9/1992 | Senior, Jr. et al. |
| 5,152,631 | A | 10/1992 | Bauer |
| 5,154,652 | A | 10/1992 | Ecklesdafer |
| 5,158,440 | A | 10/1992 | Cooper et al. |
| 5,162,858 | A | 11/1992 | Shoji et al. |
| 5,165,858 | A | 11/1992 | Gilbert et al. |
| 5,177,304 | A | 1/1993 | Nagel |
| 5,191,154 | A | 3/1993 | Nagel |

(56) References Cited

U.S. PATENT DOCUMENTS 5,192,193 A 3/1993 Cooper et al.
5,202,100 A 4/1993 Nagel et al.
5,203,681 A 4/1993 Cooper
5,209,641 A 5/1993 Hoglund et al.
5,215,448 A 6/1993 Cooper
5,268,020 A 12/1993 Claxton
5,286,163 A 2/1994 Amra et al.
5,298,233 A 3/1994 Nagel
5,301,620 A 4/1994 Nagel et al.
5,303,903 A 4/1994 Butler et al.
5,308,045 A 5/1994 Cooper
5,310,412 A 5/1994 Gilbert et al.
5,318,360 A 6/1994 Langer et al.
5,322,547 A 6/1994 Nagel et al.
5,324,341 A 6/1994 Nagel et al.
5,330,328 A 7/1994 Cooper
5,354,940 A 10/1994 Nagel
5,358,549 A 10/1994 Nagel et al.
5,358,697 A 10/1994 Nagel
5,364,078 A 11/1994 Pelton
5,369,063 A 11/1994 Gee et al.
5,383,651 A 1/1995 Blasen et al.
5,388,633 A 2/1995 Mercer, II et al.
5,395,405 A 3/1995 Nagel et al.
5,399,074 A 3/1995 Nose et al.
5,407,294 A 4/1995 Giannini
5,411,240 A 5/1995 Rapp et al.
5,425,410 A 6/1995 Reynolds
5,431,551 A 7/1995 Aquino et al.
5,435,982 A 7/1995 Wilkinson
5,436,210 A 7/1995 Wilkinson et al.
5,443,572 A 8/1995 Wilkinson et al.
5,454,423 A 10/1995 Tsuchida et al.
5,468,280 A 11/1995 Areaux
5,470,201 A 11/1995 Gilbert et al.
5,484,265 A 1/1996 Horvath et al.
5,489,734 A 2/1996 Nagel et al.
5,491,279 A 2/1996 Robert et al.
5,494,382 A 2/1996 Kloppers
5,495,746 A 3/1996 Sigworth
5,505,143 A 4/1996 Nagel
5,505,435 A 4/1996 Laszlo
5,509,791 A 4/1996 Turner
5,511,766 A 4/1996 Vassilicos
5,520,422 A 5/1996 Friedrich
5,537,940 A 7/1996 Nagel et al.
5,543,558 A 8/1996 Nagel et al.
5,555,822 A 9/1996 Loewen et al.
5,558,501 A 9/1996 Wang et al.
5,558,505 A 9/1996 Mordue et al.
5,571,486 A 11/1996 Robert et al.
5,585,532 A 12/1996 Nagel
5,586,863 A 12/1996 Gilbert et al.
5,591,243 A 1/1997 Colussi et al.
5,597,289 A 1/1997 Thut
5,613,245 A 3/1997 Robert
5,616,167 A 4/1997 Eckert
5,622,481 A 4/1997 Thut
5,629,464 A 5/1997 Bach et al.
5,634,770 A 6/1997 Gilbert et al.
5,640,706 A 6/1997 Nagel et al.
5,640,707 A 6/1997 Nagel et al.
5,640,709 A 6/1997 Nagel et al.
5,655,849 A 8/1997 McEwen et al.
5,660,614 A 8/1997 Waite et al.
5,662,725 A 9/1997 Cooper
5,676,520 A 10/1997 Thut
5,678,244 A 10/1997 Shaw et al.
5,678,807 A 10/1997 Cooper
5,679,132 A 10/1997 Rauenzahn et al.
5,685,701 A 11/1997 Chandler et al.
5,690,888 A 11/1997 Robert
5,695,732 A 12/1997 Sparks et al.
5,716,195 A * 2/1998 Thut ........................ F04D 7/065
417/53
5,717,149 A 2/1998 Nagel et al.
5,718,416 A 2/1998 Flisakowski et al.
5,735,668 A 4/1998 Klein
5,735,935 A 4/1998 Areaux
5,741,422 A 4/1998 Eichenmiller et al.
5,744,093 A 4/1998 Davis
5,744,117 A 4/1998 Wilkinson et al.
5,745,861 A 4/1998 Bell et al.
5,755,847 A 5/1998 Quayle
5,758,712 A 6/1998 Pederson
5,772,324 A 6/1998 Falk
5,776,420 A 7/1998 Nagel
5,785,494 A 7/1998 Vild et al.
5,842,832 A 12/1998 Thut
5,846,481 A 12/1998 Tilak
5,858,059 A 1/1999 Abramovich et al.
5,863,314 A 1/1999 Morando
5,866,095 A 2/1999 McGeever et al.
5,875,385 A 2/1999 Stephenson et al.
5,935,528 A 8/1999 Stephenson et al.
5,944,496 A * 8/1999 Cooper ................... F04D 7/065
417/360
5,947,705 A 9/1999 Mordue et al.
5,948,352 A 9/1999 Jagt et al.
5,951,243 A 9/1999 Cooper
5,961,285 A 10/1999 Meneice et al.
5,963,580 A 10/1999 Eckert
5,992,230 A 11/1999 Scarpa et al.
5,993,726 A 11/1999 Huang
5,993,728 A 11/1999 Vild
6,007,313 A 12/1999 Siegel
6,019,576 A 2/2000 Thut
6,027,685 A 2/2000 Cooper
6,036,745 A 3/2000 Gilbert et al.
6,074,455 A 6/2000 van Linden et al.
6,082,965 A 7/2000 Morando
6,093,000 A 7/2000 Cooper
6,096,109 A 8/2000 Nagel et al.
6,113,154 A 9/2000 Thut
6,123,523 A 9/2000 Cooper
6,152,691 A 11/2000 Thut
6,168,753 B1 1/2001 Morando
6,187,096 B1 2/2001 Thut
6,199,836 B1 3/2001 Rexford et al.
6,217,823 B1 4/2001 Vild et al.
6,231,639 B1 5/2001 Eichenmiller
6,250,881 B1 6/2001 Mordue et al.
6,254,340 B1 7/2001 Vild et al.
6,270,717 B1 8/2001 Tremblay et al.
6,280,157 B1 8/2001 Cooper
6,293,759 B1 9/2001 Thut
6,303,074 B1 10/2001 Cooper
6,345,964 B1 2/2002 Cooper
6,354,796 B1 3/2002 Morando
6,358,467 B1 3/2002 Mordue
6,364,930 B1 4/2002 Kos
6,371,723 B1 4/2002 Grant et al.
6,398,525 B1 6/2002 Cooper
6,439,860 B1 8/2002 Greer
6,451,247 B1 9/2002 Mordue et al.
6,457,940 B1 10/2002 Lehman
6,457,950 B1 10/2002 Cooper et al.
6,464,458 B2 10/2002 Vild et al.
6,474,962 B1 11/2002 Allen et al.
6,495,948 B1 12/2002 Garrett, III
6,497,559 B1 12/2002 Grant
6,500,228 B1 12/2002 Klingensmith et al.
6,503,292 B2 1/2003 Klingensmith et al.
6,524,066 B2 2/2003 Thut
6,533,535 B2 3/2003 Thut
6,551,060 B2 4/2003 Mordue et al.
6,562,286 B1 * 5/2003 Lehman .................... F27D 3/14
266/239
6,656,415 B2 12/2003 Kos
6,679,936 B2 1/2004 Quackenbush
6,689,310 B1 2/2004 Cooper
6,709,234 B2 3/2004 Gilbert et al.
6,716,147 B1 4/2004 Hinkle et al.
6,723,276 B1 4/2004 Cooper

(56) References Cited

U.S. PATENT DOCUMENTS

| | | | |
|---|---|---|---|
| 6,805,834 | B2 | 10/2004 | Thut |
| 6,843,640 | B2 | 1/2005 | Mordue et al. |
| 6,848,497 | B2 | 2/2005 | Sale et al. |
| 6,869,271 | B2 | 3/2005 | Gilbert et al. |
| 6,869,564 | B2 | 3/2005 | Gilbert et al. |
| 6,881,030 | B2 | 4/2005 | Thut |
| 6,887,424 | B2 | 5/2005 | Ohno et al. |
| 6,887,425 | B2 | 5/2005 | Mordue et al. |
| 6,902,696 | B2 | 6/2005 | Klingensmith et al. |
| 7,037,462 | B2 | 5/2006 | Klingensmith et al. |
| 7,074,361 | B2 | 7/2006 | Carolla et al. |
| 7,083,758 | B2 | 8/2006 | Tremblay |
| 7,131,482 | B2 | 11/2006 | Vincent et al. |
| 7,157,043 | B2 | 1/2007 | Neff |
| 7,204,954 | B2 | 4/2007 | Mizuno |
| 7,273,582 | B2 | 9/2007 | Mordue |
| 7,279,128 | B2 | 10/2007 | Kennedy et al. |
| 7,326,028 | B2 | 2/2008 | Morando |
| 7,402,276 | B2 | 7/2008 | Cooper |
| 7,470,392 | B2 | 12/2008 | Cooper |
| 7,476,357 | B2 | 1/2009 | Thut |
| 7,481,966 | B2 | 1/2009 | Mizuno |
| 7,497,988 | B2 | 3/2009 | Thut |
| 7,507,365 | B2 | 3/2009 | Thut |
| 7,507,367 | B2 | 3/2009 | Cooper |
| 7,543,605 | B1 | 6/2009 | Morando |
| 7,731,891 | B2 | 6/2010 | Cooper |
| 7,771,171 | B2 | 8/2010 | Mohr |
| 7,784,999 | B1 | 8/2010 | Lott |
| 7,841,379 | B1 | 11/2010 | Evans |
| 7,896,617 | B1 | 3/2011 | Morando |
| 7,906,068 | B2 | 3/2011 | Cooper |
| 8,075,837 | B2 | 12/2011 | Cooper |
| 8,110,141 | B2 | 2/2012 | Cooper |
| 8,137,023 | B2 | 3/2012 | Greer |
| 8,142,145 | B2 | 3/2012 | Thut |
| 8,178,037 | B2 | 5/2012 | Cooper |
| 8,328,540 | B2 | 12/2012 | Wang |
| 8,333,921 | B2 | 12/2012 | Thut |
| 8,337,746 | B2 | 12/2012 | Cooper |
| 8,361,379 | B2 | 1/2013 | Cooper |
| 8,366,993 | B2 | 2/2013 | Cooper |
| 8,409,495 | B2 | 4/2013 | Cooper |
| 8,440,135 | B2 | 5/2013 | Cooper |
| 8,444,911 | B2 | 5/2013 | Cooper |
| 8,449,814 | B2 | 5/2013 | Cooper |
| 8,475,594 | B2 | 7/2013 | Bright et al. |
| 8,475,708 | B2 | 7/2013 | Cooper |
| 8,480,950 | B2 | 7/2013 | Jetten et al. |
| 8,501,084 | B2 | 8/2013 | Cooper |
| 8,524,146 | B2 | 9/2013 | Cooper |
| 8,529,828 | B2 | 9/2013 | Cooper |
| 8,535,603 | B2 | 9/2013 | Cooper |
| 8,580,218 | B2 | 11/2013 | Turenne et al. |
| 8,613,884 | B2 | 12/2013 | Cooper |
| 8,714,914 | B2 | 5/2014 | Cooper |
| 8,753,563 | B2 | 6/2014 | Cooper |
| 8,840,359 | B2 | 9/2014 | Vick et al. |
| 8,899,932 | B2 | 12/2014 | Tetkoskie et al. |
| 8,915,830 | B2 | 12/2014 | March et al. |
| 8,920,680 | B2 | 12/2014 | Mao |
| 9,011,761 | B2 | 4/2015 | Cooper |
| 9,017,597 | B2 | 4/2015 | Cooper |
| 9,034,244 | B2 | 5/2015 | Cooper |
| 9,057,376 | B2 | 6/2015 | Thut |
| 9,057,377 | B1 | 6/2015 | Thut |
| 9,074,601 | B1 | 7/2015 | Thut |
| 9,080,577 | B2 | 7/2015 | Cooper |
| 9,108,224 | B2 | 8/2015 | Schererz et al. |
| 9,108,244 | B2 | 8/2015 | Cooper |
| 9,156,087 | B2 | 10/2015 | Cooper |
| 9,193,532 | B2 | 11/2015 | March et al. |
| 9,205,490 | B2 | 12/2015 | Cooper |
| 9,234,520 | B2 | 1/2016 | Morando |
| 9,273,376 | B2 | 3/2016 | Lutes et al. |
| 9,328,615 | B2 | 5/2016 | Cooper |
| 9,377,028 | B2 | 6/2016 | Cooper |
| 9,382,599 | B2 | 7/2016 | Cooper |
| 9,383,140 | B2 | 7/2016 | Cooper |
| 9,388,925 | B2 | 7/2016 | Juarez |
| 9,409,232 | B2 | 8/2016 | Cooper |
| 9,410,744 | B2 | 8/2016 | Cooper |
| 9,422,942 | B2 | 8/2016 | Cooper |
| 9,435,343 | B2 | 9/2016 | Cooper |
| 9,464,636 | B2 | 10/2016 | Cooper |
| 9,470,239 | B2 | 10/2016 | Cooper |
| 9,476,644 | B2 | 10/2016 | Howitt et al. |
| 9,481,035 | B2 | 11/2016 | Cooper |
| 9,481,918 | B2 | 11/2016 | Vild et al. |
| 9,482,469 | B2 | 11/2016 | Cooper |
| 9,494,366 | B1 | 11/2016 | Thut |
| 9,506,129 | B2 | 11/2016 | Cooper |
| 9,506,346 | B2 | 11/2016 | Bright et al. |
| 9,532,670 | B2 | 1/2017 | Vanessen |
| 9,566,645 | B2 | 2/2017 | Cooper |
| 9,581,388 | B2 | 2/2017 | Cooper |
| 9,587,883 | B2 | 3/2017 | Cooper |
| 9,632,670 | B2 | 4/2017 | Wu |
| 9,643,247 | B2 | 5/2017 | Cooper |
| 9,657,578 | B2 | 5/2017 | Cooper |
| 9,855,600 | B2 | 1/2018 | Cooper |
| 9,862,026 | B2 | 1/2018 | Cooper |
| 9,903,383 | B2 | 2/2018 | Cooper |
| 9,909,808 | B2 | 3/2018 | Cooper |
| 9,920,767 | B2 | 3/2018 | Klain et al. |
| 9,925,587 | B2 | 3/2018 | Cooper |
| 9,951,777 | B2 | 4/2018 | Morando et al. |
| 9,970,442 | B2 | 5/2018 | Tipton |
| 9,982,945 | B2 | 5/2018 | Cooper |
| 10,052,688 | B2 | 8/2018 | Cooper |
| 10,072,897 | B2 | 9/2018 | Cooper |
| 10,126,058 | B2 | 11/2018 | Cooper |
| 10,126,059 | B2 | 11/2018 | Cooper |
| 10,138,892 | B2 | 11/2018 | Cooper |
| 10,195,664 | B2 | 2/2019 | Cooper et al. |
| 10,267,314 | B2 | 4/2019 | Cooper |
| 10,274,256 | B2 | 4/2019 | Cooper |
| 10,302,361 | B2 | 5/2019 | Cooper |
| 10,307,821 | B2 | 6/2019 | Cooper |
| 10,309,725 | B2 | 6/2019 | Cooper |
| 10,322,451 | B2 | 6/2019 | Cooper |
| 10,345,045 | B2 | 7/2019 | Cooper |
| 10,352,620 | B2 | 7/2019 | Cooper |
| 10,428,821 | B2 | 10/2019 | Cooper |
| 10,458,708 | B2 | 10/2019 | Cooper |
| 10,465,688 | B2 | 11/2019 | Cooper |
| 10,562,097 | B2 | 2/2020 | Cooper |
| 10,570,745 | B2 | 2/2020 | Cooper |
| 10,641,270 | B2 | 5/2020 | Cooper |
| 10,641,279 | B2 | 5/2020 | Cooper |
| 10,675,679 | B2 | 6/2020 | Cooper |
| 11,020,798 | B2 | 6/2021 | Cooper |
| 11,098,719 | B2 | 8/2021 | Cooper |
| 11,098,720 | B2 | 8/2021 | Cooper |
| 11,103,920 | B2 | 8/2021 | Cooper |
| 11,130,173 | B2 | 9/2021 | Cooper |
| 11,149,747 | B2 | 10/2021 | Cooper |
| 11,167,345 | B2 | 11/2021 | Cooper |
| 11,185,916 | B2 | 11/2021 | Cooper |
| 11,286,939 | B2 | 3/2022 | Cooper |
| 11,358,216 | B2 | 6/2022 | Cooper |
| 11,358,217 | B2 | 6/2022 | Cooper |
| 11,391,293 | B2 | 7/2022 | Cooper |
| 11,471,938 | B2 | 10/2022 | Fontana |
| 11,519,414 | B2 | 12/2022 | Cooper |
| 2001/0000465 | A1 | 4/2001 | Thut |
| 2002/0089099 | A1 | 7/2002 | Denning |
| 2002/0102159 | A1 | 8/2002 | Thut |
| 2002/0146313 | A1 | 10/2002 | Thut |
| 2002/0185789 | A1 | 12/2002 | Klingensmith et al. |
| 2002/0185790 | A1 | 12/2002 | Kilgensmith |
| 2002/0185794 | A1 | 12/2002 | Vincent |
| 2003/0047850 | A1 | 3/2003 | Areaux |
| 2003/0075844 | A1 | 4/2003 | Mordue et al. |

(56) References Cited

U.S. PATENT DOCUMENTS

| | | | |
|---|---|---|---|
| 2003/0082052 | A1 | 5/2003 | Gilbert et al. |
| 2003/0151176 | A1 | 8/2003 | Ohno |
| 2003/0201583 | A1 | 10/2003 | Klingensmith |
| 2004/0050525 | A1 | 3/2004 | Kennedy et al. |
| 2004/0076533 | A1 | 4/2004 | Cooper |
| 2004/0096330 | A1 | 5/2004 | Gilbert |
| 2004/0115079 | A1 | 6/2004 | Cooper |
| 2004/0245684 | A1 | 12/2004 | Kojo |
| 2004/0262825 | A1 | 12/2004 | Cooper |
| 2005/0013713 | A1 | 1/2005 | Cooper |
| 2005/0013714 | A1 | 1/2005 | Cooper |
| 2005/0013715 | A1 | 1/2005 | Cooper |
| 2005/0053499 | A1 | 3/2005 | Cooper |
| 2005/0077730 | A1 | 4/2005 | Thut |
| 2005/0081607 | A1 | 4/2005 | Patel et al. |
| 2005/0116398 | A1 | 6/2005 | Tremblay |
| 2006/0180963 | A1 | 8/2006 | Thut |
| 2006/0198725 | A1 | 9/2006 | Thut |
| 2007/0253807 | A1 | 11/2007 | Cooper |
| 2008/0163999 | A1 | 7/2008 | Hymas et al. |
| 2008/0202644 | A1 | 8/2008 | Grassi |
| 2008/0211147 | A1 | 9/2008 | Cooper |
| 2008/0213111 | A1 | 9/2008 | Cooper |
| 2008/0230966 | A1 | 9/2008 | Cooper |
| 2008/0253905 | A1 | 10/2008 | Morando et al. |
| 2008/0304970 | A1 | 12/2008 | Cooper |
| 2008/0314548 | A1 | 12/2008 | Cooper |
| 2009/0054167 | A1 | 2/2009 | Cooper |
| 2009/0140013 | A1 | 6/2009 | Cooper |
| 2009/0269191 | A1 | 10/2009 | Cooper |
| 2010/0104415 | A1 | 4/2010 | Morando |
| 2010/0200354 | A1 | 8/2010 | Yagi et al. |
| 2011/0133374 | A1 | 6/2011 | Cooper |
| 2011/0135457 | A1 | 6/2011 | Cooper |
| 2011/0140318 | A1 | 6/2011 | Reeves et al. |
| 2011/0140319 | A1 | 6/2011 | Cooper |
| 2011/0140619 | A1 | 6/2011 | Lin |
| 2011/0142603 | A1 | 6/2011 | Cooper |
| 2011/0142606 | A1 | 6/2011 | Cooper |
| 2011/0148012 | A1 | 6/2011 | Cooper |
| 2011/0163486 | A1 | 7/2011 | Cooper |
| 2011/0210232 | A1 | 9/2011 | Cooper |
| 2011/0220771 | A1 | 9/2011 | Cooper |
| 2011/0227338 | A1 | 9/2011 | Pollack |
| 2011/0303706 | A1 | 12/2011 | Cooper |
| 2012/0003099 | A1 | 1/2012 | Tetkoskie |
| 2012/0163959 | A1 | 6/2012 | Morando |
| 2013/0105102 | A1 | 5/2013 | Cooper |
| 2013/0142625 | A1 | 6/2013 | Cooper |
| 2013/0214014 | A1 | 8/2013 | Cooper |
| 2013/0224038 | A1 | 8/2013 | Tetkoskie et al. |
| 2013/0292426 | A1 | 11/2013 | Cooper |
| 2013/0292427 | A1 | 11/2013 | Cooper |
| 2013/0299524 | A1 | 11/2013 | Cooper |
| 2013/0299525 | A1 | 11/2013 | Cooper |
| 2013/0306687 | A1 | 11/2013 | Cooper |
| 2013/0334744 | A1 | 12/2013 | Tremblay |
| 2013/0343904 | A1 | 12/2013 | Cooper |
| 2014/0008849 | A1 | 1/2014 | Cooper |
| 2014/0041252 | A1 | 2/2014 | Vild et al. |
| 2014/0044520 | A1 | 2/2014 | Tipton |
| 2014/0083253 | A1 | 3/2014 | Lutes et al. |
| 2014/0210144 | A1 | 7/2014 | Torres et al. |
| 2014/0232048 | A1 | 8/2014 | Howitt et al. |
| 2014/0252697 | A1 | 9/2014 | Rauch |
| 2014/0252701 | A1 | 9/2014 | Cooper |
| 2014/0261800 | A1 | 9/2014 | Cooper |
| 2014/0263482 | A1 | 9/2014 | Cooper |
| 2014/0265068 | A1 | 9/2014 | Cooper |
| 2014/0271219 | A1 | 9/2014 | Cooper |
| 2014/0363309 | A1 | 12/2014 | Henderson et al. |
| 2015/0069679 | A1 | 3/2015 | Henderson et al. |
| 2015/0184311 | A1 | 7/2015 | Turenne |
| 2015/0192364 | A1 | 7/2015 | Cooper |
| 2015/0217369 | A1 | 8/2015 | Cooper |
| 2015/0219111 | A1 | 8/2015 | Cooper |
| 2015/0219112 | A1 | 8/2015 | Cooper |
| 2015/0219113 | A1 | 8/2015 | Cooper |
| 2015/0219114 | A1 | 8/2015 | Cooper |
| 2015/0224574 | A1 | 8/2015 | Cooper |
| 2015/0252807 | A1 | 9/2015 | Cooper |
| 2015/0285557 | A1 | 10/2015 | Cooper |
| 2015/0285558 | A1 | 10/2015 | Cooper |
| 2015/0323256 | A1 | 11/2015 | Cooper |
| 2015/0328682 | A1 | 11/2015 | Cooper |
| 2015/0328683 | A1 | 11/2015 | Cooper |
| 2016/0031007 | A1 | 2/2016 | Cooper |
| 2016/0040265 | A1 | 2/2016 | Cooper |
| 2016/0047602 | A1 | 2/2016 | Cooper |
| 2016/0053762 | A1 | 2/2016 | Cooper |
| 2016/0053814 | A1 | 2/2016 | Cooper |
| 2016/0082507 | A1 | 3/2016 | Cooper |
| 2016/0089718 | A1 | 3/2016 | Cooper |
| 2016/0091251 | A1 | 3/2016 | Cooper |
| 2016/0116216 | A1 | 4/2016 | Schlicht et al. |
| 2016/0221855 | A1 | 8/2016 | Retorick et al. |
| 2016/0250686 | A1 | 9/2016 | Cooper |
| 2016/0265535 | A1 | 9/2016 | Cooper |
| 2016/0305711 | A1 | 10/2016 | Cooper |
| 2016/0320129 | A1 | 11/2016 | Cooper |
| 2016/0320130 | A1 | 11/2016 | Cooper |
| 2016/0320131 | A1 | 11/2016 | Cooper |
| 2016/0346836 | A1 | 12/2016 | Henderson et al. |
| 2016/0348973 | A1 | 12/2016 | Cooper |
| 2016/0348974 | A1 | 12/2016 | Cooper |
| 2016/0348975 | A1 | 12/2016 | Cooper |
| 2017/0037852 | A1 | 2/2017 | Bright et al. |
| 2017/0038146 | A1 | 2/2017 | Cooper |
| 2017/0045298 | A1 | 2/2017 | Cooper |
| 2017/0056973 | A1 | 3/2017 | Tremblay et al. |
| 2017/0082368 | A1 | 3/2017 | Cooper |
| 2017/0106435 | A1 | 4/2017 | Vincent |
| 2017/0106441 | A1 | 4/2017 | Vincent |
| 2017/0130298 | A1 | 5/2017 | Teranishi et al. |
| 2017/0167793 | A1 | 6/2017 | Cooper et al. |
| 2017/0198721 | A1 | 7/2017 | Cooper |
| 2017/0219289 | A1 | 8/2017 | Williams et al. |
| 2017/0241713 | A1 | 8/2017 | Henderson et al. |
| 2017/0246681 | A1 | 8/2017 | Tipton et al. |
| 2017/0274446 | A1 | 9/2017 | Wagstaff |
| 2017/0276430 | A1 | 9/2017 | Cooper |
| 2018/0058465 | A1 | 3/2018 | Cooper |
| 2018/0111189 | A1 | 4/2018 | Cooper |
| 2018/0178281 | A1 | 6/2018 | Cooper |
| 2018/0195513 | A1 | 7/2018 | Cooper |
| 2018/0311726 | A1 | 11/2018 | Cooper |
| 2019/0032675 | A1 | 1/2019 | Cooper |
| 2019/0160642 | A1 | 5/2019 | Joo et al. |
| 2019/0270134 | A1 | 9/2019 | Cooper |
| 2019/0293089 | A1 | 9/2019 | Cooper |
| 2019/0351481 | A1 | 11/2019 | Tetkoskie |
| 2019/0360491 | A1 | 11/2019 | Cooper |
| 2019/0360492 | A1 | 11/2019 | Cooper |
| 2019/0368494 | A1 | 12/2019 | Cooper |
| 2020/0130050 | A1 | 4/2020 | Cooper |
| 2020/0130051 | A1 | 4/2020 | Cooper |
| 2020/0130052 | A1 | 4/2020 | Cooper |
| 2020/0130053 | A1 | 4/2020 | Cooper |
| 2020/0130054 | A1 | 4/2020 | Cooper |
| 2020/0182247 | A1 | 6/2020 | Cooper |
| 2020/0182248 | A1 | 6/2020 | Cooper |
| 2020/0256350 | A1 | 8/2020 | Cooper |
| 2020/0360987 | A1 | 11/2020 | Cooper |
| 2020/0360988 | A1 | 11/2020 | Fontana |
| 2020/0360989 | A1 | 11/2020 | Cooper |
| 2020/0360990 | A1 | 11/2020 | Cooper |
| 2020/0362865 | A1 | 11/2020 | Cooper |
| 2020/0363128 | A1 | 11/2020 | Cooper |
| 2021/0199115 | A1 | 7/2021 | Cooper |
| 2021/0254622 | A1 | 8/2021 | Cooper |
| 2022/0025905 | A1 | 1/2022 | Cooper |
| 2022/0080498 | A1 | 3/2022 | Cooper |
| 2022/0193764 | A1 | 6/2022 | Cooper |
| 2022/0213895 | A1 | 7/2022 | Cooper |

(56) References Cited

U.S. PATENT DOCUMENTS

| | | | |
|---|---|---|---|
| 2022/0234099 | A1 | 7/2022 | Cooper |
| 2022/0381246 | A1 | 12/2022 | Cooper |
| 2023/0001474 | A1 | 1/2023 | Cooper |
| 2023/0219132 | A1 | 7/2023 | Cooper |

* cited by examiner

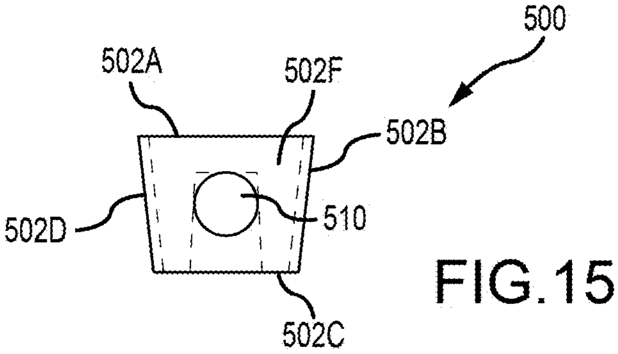
FIG.15
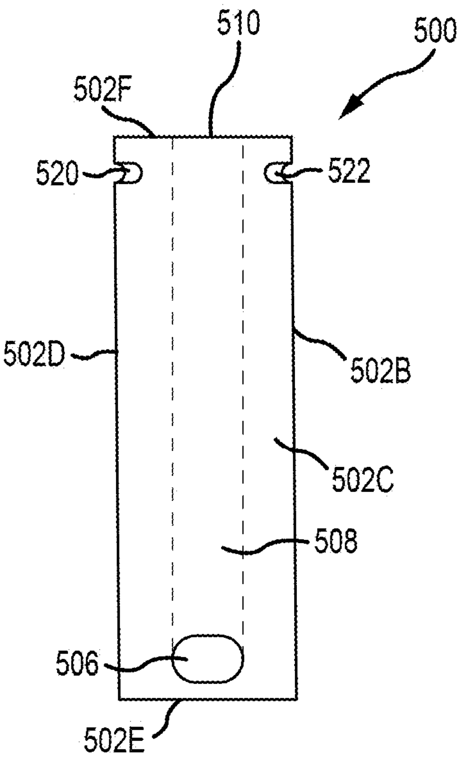
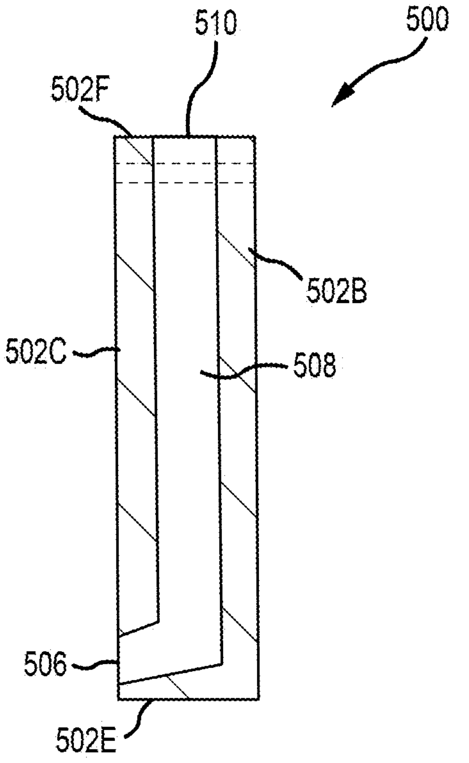
FIG.13
FIG.14

MOLTEN METAL TRANSFER DEVICE

CROSS REFERENCE TO RELATED APPLICATION

This application is a continuation of and claims priority to U.S. patent application Ser. No. 17/334,259 entitled MOLTEN METAL TRANSFER DEVICE, filed May 28, 2021, the contents of the aforementioned application is incorporated herein in its entirety for all purposes.

BACKGROUND

As used herein, the term "molten metal" means any metal or combination of metals in liquid form, such as aluminum, copper, iron, zinc, and alloys thereof. The term "gas" means any gas or combination of gases, including argon, nitrogen, chlorine, fluorine, Freon, and helium, which are released into molten metal.

Known molten-metal pumps include a pump base (also called a housing or casing), one or more inlets (an inlet being an opening in the housing to allow molten metal to enter a pump chamber), a pump chamber of any suitable configuration, which is an open area formed within the housing, and a discharge, which is a channel or conduit of any structure or type communicating with the pump chamber (in an axial pump the chamber and discharge may be the same structure or different areas of the same structure) leading from the pump chamber to an outlet, which is an opening formed in the exterior of the housing through which molten metal exits the casing. An impeller, also called a rotor, is mounted in the pump chamber, and is connected to a drive device. The drive shaft is typically an impeller shaft connected to one end of a motor shaft; the other end of the drive shaft being connected to an impeller. Often, the impeller (or rotor) shaft is comprised of graphite and/or ceramic, the motor shaft is comprised of steel, and the two are connected by a coupling. As the motor turns the drive shaft, the drive shaft turns the impeller and the impeller pushes molten metal out of the pump chamber, through the discharge, out of the outlet and into the molten metal bath. Most molten metal pumps are gravity fed, wherein gravity forces molten metal through the inlet and into the pump chamber as the impeller pushes molten metal out of the pump chamber. Other molten metal pumps do not include a base or support posts and are sized to fit into a structure by which molten metal is pumped. Most pumps have a metal platform, or super structure, that is either supported by a plurality of support posts attached to the pump base, or unsupported if there is no base. The motor is positioned on the superstructure if a superstructure is used.

This application incorporates by reference the portions of the following documents that are not inconsistent with this disclosure: U.S. Pat. No. 4,598,899, issued Jul. 8, 1986, to Paul V. Cooper, U.S. Pat. No. 5,203,681, issued Apr. 20, 1993, to Paul V. Cooper, U.S. Pat. No. 5,308,045, issued May 3, 1994, to Paul V. Cooper, U.S. Pat. No. 5,662,725, issued Sep. 2, 1997, to Paul V. Cooper, U.S. Pat. No. 5,678,807, issued Oct. 21, 1997, to Paul V. Cooper, U.S. Pat. No. 6,027,685, issued Feb. 22, 2000, to Paul V. Cooper, U.S. Pat. No. 6,124,523, issued Sep. 26, 2000, to Paul V. Cooper, U.S. Pat. No. 6,303,074, issued Oct. 16, 2001, to Paul V. Cooper, U.S. Pat. No. 6,689,310, issued Feb. 10, 2004, to Paul V. Cooper, U.S. Pat. No. 6,723,276, issued Apr. 20, 2004, to Paul V. Cooper, U.S. Pat. No. 7,402,276, issued Jul. 22, 2008, to Paul V. Cooper, U.S. Pat. No. 7,470,392, issued Dec. 30, 2008, to Paul V. Cooper, U.S. Pat. No. 7,507,367, issued Mar. 24, 2009, to Paul V. Cooper, U.S. Pat. No. 7,906,068, issued Mar. 15, 2011, to Paul V. Cooper, U.S. Pat. No. 8,075,837, issued Dec. 13, 2011, to Paul V. Cooper, U.S. Pat. No. 8,110,141, issued Feb. 7, 2012, to Paul V. Cooper, U.S. Pat. No. 8,178,037, issued May 15, 2012, to Paul V. Cooper, U.S. Pat. No. 8,337,746, issued Dec. 25, 2012, to Paul V. Cooper, U.S. Pat. No. 8,361,379, issued Jan. 29, 2013, to Paul V. Cooper, U.S. Pat. No. 8,366,993, issued Feb. 5, 2013, to Paul V. Cooper, U.S. Pat. No. 8,409,495, issued Apr. 2, 2013, to Paul V. Cooper, U.S. Pat. No. 8,440,135, issued May 15, 2013, to Paul V. Cooper, U.S. Pat. No. 8,444,911, issued May 21, 2013, to Paul V. Cooper, U.S. Pat. No. 8,449,814, issued May 28, 2013, to Paul V. Cooper, U.S. Pat. No. 8,475,708, issued Jul. 2, 2013, to Paul V. Cooper, U.S. Pat. No. 8,501,084, issued Aug. 6, 2013, to Paul V. Cooper, U.S. patent application Ser. No. 12/895,796, filed Sep. 30, 2010, to Paul V. Cooper, U.S. patent application Ser. No. 13/791,952, filed Mar. 9, 2013, to Paul V. Cooper, U.S. Pat. No. 8,529,828, issued Sep. 10, 2013, to Paul V. Cooper, U.S. Pat. No. 8,535,603 issued Sep. 17, 2013, to Paul V. Cooper, U.S. Pat. No. 8,613,884, issued Dec. 24, 2013 to Paul V. Cooper, U.S. Pat. No. 8,714,914, issued May 6, 2014 to Paul V. Cooper, U.S. Pat. No. 8,753,563, issued Jun. 17, 2014, to Paul V. Cooper, U.S. Pat. No. 9,011,761, issued Apr. 21, 2015, to Paul V. Cooper, U.S. Pat. No. 9,017,597, issued Apr. 28, 2015, to Paul V. Cooper, U.S. Pat. No. 9,034,244, issued May 19, 2015, to Paul V. Cooper, U.S. Pat. No. 9,080,577, issued Jul. 14, 2015, to Paul V. Cooper, U.S. Pat. No. 9,108,244, issued Aug. 18, 2015, to Paul V. Cooper, U.S. Pat. No. 9,156,087, issued Oct. 13, 2015, to Paul V. Cooper, U.S. Pat. No. 9,205,490, issued Dec. 8, 2015, to Paul V. Cooper, U.S. Pat. No. 9,328,615, issued May 3, 2016 to Paul V. Cooper, U.S. Pat. No. 9,377,028, issued Jun. 28, 2016, to Paul V. Cooper, U.S. Pat. No. 9,382,599, issued Jul. 5, 2016, to Paul V. Cooper, U.S. Pat. No. 9,383,140, issued Jul. 5, 2016, to Paul V. Cooper, U.S. Pat. No. 9,409,232, issued Aug. 9, 2016, to Paul V. Cooper, U.S. Pat. No. 9,410,744, issued Aug. 9, 2016, to Paul V. Cooper, U.S. Pat. No. 9,422,942, issued Aug. 23, 2016, to Paul V. Cooper, U.S. Pat. No. 9,435,343, issued Sep. 6, 2016, to Paul V. Cooper, U.S. Pat. No. 9,464,636, issued Oct. 11, 2016, to Paul V. Cooper, U.S. Pat. No. 9,470,239, issued Oct. 18, 2016, to Paul V. Cooper, U.S. Pat. No. 9,481,035, issued Nov. 1, 2016, to Paul V. Cooper, U.S. Pat. No. 9,482,469, issued Nov. 1, 2016, to Paul V. Cooper, U.S. Pat. No. 9,506,129, issued Nov. 29, 2016, to Paul V. Cooper, U.S. Pat. No. 9,566,645, issued Feb. 14, 2017, to Paul V. Cooper, U.S. Pat. No. 9,581,388, issued Feb. 28, 2017, to Paul V. Cooper, U.S. Pat. No. 9,587,883, issued Mar. 7, 2017, to Paul V. Cooper, U.S. Pat. No. 9,643,247, issued May 9, 2017, to Paul V. Cooper, U.S. Pat. No. 9,657,578, issued May 23, 2017, to Paul V. Cooper, U.S. Pat. No. 9,855,600, issued Jan. 2, 2018, to Paul V. Cooper, U.S. Pat. No. 9,862,026, issued Jan. 9, 2018, to Paul V. Cooper, U.S. Pat. No. 9,903,383, issued Feb. 27, 2018, to Paul V. Cooper, U.S. Pat. No. 9,909,808, issued Mar. 6, 2018, to Paul V. Cooper, U.S. Pat. No. 9,925,587, issued Mar. 27, 2018, to Paul V. Cooper, entitled U.S. Pat. No. 9,982,945, issued May 29, 2018, to Paul V. Cooper, U.S. Pat. No. 10,052,688, issued Aug. 21, 2018, to Paul V. Cooper, U.S. Pat. No. 10,072,891, issued Sep. 11, 2018, to Paul V. Cooper, U.S. Pat. No. 10,126,058, issued Nov. 13, 2018, to Paul V. Cooper, U.S. Pat. No. 10,126,059, issued Nov. 13, 2018, to Paul V. Cooper, U.S. Pat. No. 10,138,892, issued Nov. 27, 2018, to Paul V. Cooper, U.S. Pat. No. 10,195,664, issued Feb. 5, 2019, to Paul V. Cooper, U.S. Pat. No. 10,267,314, issued Apr. 23, 2019, to Paul V. Cooper, U.S. Pat. No. 10,274,256, issued Apr. 30, 2019, to Paul V. Cooper, U.S.

Pat. No. 10,302,361, issued May 28, 2019, to Paul V. Cooper, U.S. Pat. No. 10,309,725, issued Jun. 4, 2019, to Paul V. Cooper, U.S. Pat. No. 10,307,821, issued Jun. 4, 2019, to Paul V. Cooper, U.S. Pat. No. 10,322,451, issued Jun. 18, 2019, to Paul V. Cooper, U.S. Pat. No. 10,345,045, issued Jul. 9, 2019, to Paul V. Cooper, U.S. Pat. No. 10,352,620, issued Jul. 16, 2019, to Paul V. Cooper, U.S. Pat. No. 10,428,821, issued Oct. 1, 2019, to Paul V. Cooper, U.S. Pat. No. 10,458,708, issued Oct. 29, 2019, to Paul V. Cooper, U.S. Pat. No. 10,465,688, issued Nov. 5, 2019, to Paul V. Cooper, U.S. Pat. No. 10,562,097, issued Feb. 18, 2020, to Paul V. Cooper, U.S. Pat. No. 10,570,745, issued Feb. 25, 2020, to Paul V. Cooper, U.S. Pat. No. 10,641,279, issued May 5, 2020, to Paul V. Cooper, U.S. Pat. No. 10,641,270, issued May 5, 2020, to Paul V. Cooper, U.S. Pat. No. 10,675,679, issued Jun. 9, 2020, to Paul V. Cooper, U.S. Pat. No. 10,947,980, issued May 16, 2021, to Paul V. Cooper, U.S. Pat. No. 11,020,798, issued Jun. 1, 2021, to Paul V. Cooper, U.S. Pat. No. 11,098,719, issued Aug. 24, 2021, to Paul V. Cooper, U.S. Pat. No. 11,098,720, issued Aug. 24, 2021, to Paul V. Cooper, U.S. Pat. No. 11,103,920, issued Aug. 31, 2021, to Paul V. Cooper, U.S. Pat. No. 11,130,173, issued Sep. 28, 2021, to Paul V. Cooper, U.S. Pat. No. 11,149,747, issued Oct. 19, 2021, to Paul V. Cooper, U.S. Pat. No. 11,167,345, issued Nov. 9, 2021, to Paul V. Cooper, U.S. Pat. No. 11,185,916, issued Nov. 30, 2021, to Paul V. Cooper, U.S. Pat. No. 11,286,939, issued Mar. 29, 2022, to Paul V. Cooper, U.S. Pat. No. 11,391,293, issued Jul. 19, 2022, to Paul V. Cooper, U.S. Pat. No. 11,471,938, issued Oct. 18, 2022, to Paul V. Cooper, U.S. Pat. No. 11,358,216, issued Jun. 14, 2022, to Paul V. Cooper, U.S. Pat. No. 11,358,217, issued Jun. 14, 2022, to Paul V. Cooper, U.S. Pat. No. 11,519,414, issued Dec. 6, 2022, to Paul V. Cooper, U.S. Pat. No. 11,759,854, issued Sep. 19, 2023, to Paul V. Cooper, U.S. Pat. No. 11,759,853, issued Sep. 19, 2023, to Paul V. Cooper, U.S. patent application Ser. No. 16/413,142, filed May 15, 2019, by Paul V. Cooper, U.S. patent application Ser. No. 16/533,383, filed Aug. 6, 2019, by Paul V. Cooper, U.S. patent application Ser. No. 16/533,404, filed Aug. 6, 2019, by Paul V. Cooper, U.S. patent application Ser. No. 16/877,267, filed May 18, 2020, by Paul V. Cooper, U.S. patent application Ser. No. 16/877,364, filed May 18, 2020, by Paul V. Cooper, U.S. patent application Ser. No. 17/200,785, filed Mar. 13, 2021, by Paul V. Cooper, U.S. patent application Ser. No. 17/334,259, filed May 28, 2021, by Paul V. Cooper, U.S. patent application Ser. No. 17/496,229, filed Oct. 7, 2021, by Paul V. Cooper, U.S. patent application Ser. No. 17/703,912, filed Mar. 24, 2022, by Paul V. Cooper, U.S. patent application Ser. No. 17/719,274, filed Apr. 12, 2022, by Paul V. Cooper, U.S. patent application Ser. No. 17/826,111, filed May 26, 2022, by Paul V. Cooper, U.S. patent application Ser. No. 17/939,898 filed Sep. 7, 2022, by Vince Fontana, U.S. patent application Ser. No. 18/114,665, filed Feb. 27, 2023, by Paul V. Cooper, U.S. patent application Ser. No. 18/139,936, filed Apr. 26, 2023, by Paul V. Cooper, U.S. patent application Ser. No. 18/480,755, filed Oct. 4, 2023, by Vince Fontana, U.S. patent application Ser. No. 18/502,457, filed Nov. 6, 2023, by Paul V. Cooper.

Three basic types of pumps for pumping molten metal, such as molten aluminum, are utilized: circulation pumps, transfer pumps and gas-release pumps. Circulation pumps are used to circulate the molten metal within a bath, thereby generally equalizing the temperature of the molten metal. Circulation pumps may be used in any vessel, such as in a reverbatory furnace having an external well. The well is usually an extension of the charging well, in which scrap metal is charged (i.e., added).

Standard transfer pumps are generally used to transfer molten metal from one structure to another structure such as a ladle or another furnace. A standard transfer pump has a riser tube connected to a pump discharge and supported by the superstructure. As molten metal is pumped it is pushed up the riser tube (sometimes called a metal-transfer conduit) and out of the riser tube, which generally has an elbow at its upper end, so molten metal is released into a different vessel from which the pump is positioned.

Gas-release pumps, such as gas-injection pumps, circulate molten metal while introducing a gas into the molten metal. In the purification of molten metals, particularly aluminum, it is frequently desired to remove dissolved gases such as hydrogen, or dissolved metals, such as magnesium. As is known by those skilled in the art, the removing of dissolved gas is known as "degassing" while the removal of magnesium is known as "demagging." Gas-release pumps may be used for either of both of these purposes or for any other application for which it is desirable to introduce gas into molten metal.

Gas-release pumps generally include a gas-transfer conduit having a first end that is connected to a gas source and a second end submerged in the molten metal bath. Gas is introduced into the first end and is released from the second end into the molten metal. The gas may be released downstream of the pump chamber into either the pump discharge or a metal-transfer conduit extending from the discharge, or into a stream of molten metal exiting either the discharge or the metal-transfer conduit. Alternatively, gas may be released into the pump chamber or upstream of the pump chamber at a position where molten metal enters the pump chamber. The gas may also be released into any suitable location in a molten metal bath.

Molten metal pump casings and rotors often employ a bearing device comprising ceramic rings wherein there are one or more rings on the rotor that align with rings in the pump chamber (such as rings at the inlet and outlet) when the rotor is placed in the pump chamber. The purpose of the bearing device is to reduce damage to the soft, graphite components, particularly the rotor and pump base, during pump operation.

Generally, a degasser (also called a rotary degasser) for molten metal, such as molten aluminum, includes (1) an impeller shaft having a first end, a second end and a passage for transferring gas, (2) an impeller, and (3) a drive source for rotating the impeller shaft and the impeller. The first end of the impeller shaft is connected to the drive source and to a gas source and the second end is connected to the impeller.

Generally, a scrap melter for molten metal (particularly molten aluminum) includes an impeller affixed to an end of a drive shaft, and a drive source attached to the other end of the drive shaft for rotating the shaft and the impeller. The movement of the impeller draws molten metal and scrap metal downward into the molten metal bath in order to melt the scrap. A circulation pump is often used in conjunction with the scrap melter to circulate the molten metal in order to maintain a relatively constant temperature within the molten metal.

The materials forming the components that contact the molten metal bath should remain relatively stable in the bath. Structural refractory materials, such as graphite or ceramics, that are resistant to disintegration by corrosive attack from the molten metal may be used. As used herein "ceramics" or "ceramic" refers to any oxidized metal (including silicon, such as silicon dioxide) or carbon-based material, excluding graphite, or other ceramic material capable of being used in a molten metal. "Graphite" means any type of graphite, whether or not chemically treated. Graphite is suitable for being formed into pump components because it is (a) soft and relatively easy to machine, (b) not as brittle as ceramics and less prone to breakage, and (c) less expensive than ceramics. Ceramic, however, is more resistant to corrosion by molten aluminum than graphite.

Some devices or systems used to transfer molten metal include a molten metal pump and a molten metal-transfer conduit, or metal-transfer conduit. The molten metal pump may have a pump base with a pump chamber in which a rotor is positioned, and a discharge that extends from the pump chamber to a pump outlet formed in a side of the pump base. The metal-transfer conduit has a metal-transfer inlet (or transfer inlet) in fluid communication with the pump outlet. In prior devices there was often a gap between the pump outlet and the transfer inlet so more pump speed was required to raise the level of molten metal in the metal-transfer conduit. Alignment of the pump outlet with the transfer inlet of the metal-transfer conduit would be an advantage. The better the alignment, the less pressure required from the pump to push molten metal into the metal-transfer conduit, up the passage of the metal-transfer conduit, and out of the transfer outlet.

SUMMARY

Disclosed is a device that includes (1) a pump having a pump base, and (2) a metal-transfer conduit in communication with the pump. As the pump pumps molten metal, the molten metal exits the outlet of the pump, enters the inlet of the metal-transfer conduit, travels up the metal-transfer passage of the metal-transfer conduit, and exits the conduit outlet. A launder or pipe is preferably connected to the metal-transfer conduit outlet so molten metal exiting the metal-transfer conduit outlet enters such a structure and is transferred to where the operator desires.

The pump may be a circulation pump or gas-injection pump having a base configured to closely align with, and potentially connect to, the metal-transfer conduit.

The pump base includes an indentation in one side, wherein the indentation is configured to receive the metal-transfer conduit, and a pump outlet in the indentation. The metal-transfer conduit has a transfer inlet that leads to a passage inside of the metal-transfer conduit and a transfer outlet above the transfer inlet.

The metal-transfer conduit is positioned in the indentation such that the pump outlet is aligned with the transfer inlet. As the pump is operated molten metal exits the pump outlet and enters the transfer inlet. The molten metal then travels upwards in the passage until it passes through the transfer outlet and out of the metal-transfer conduit.

BRIEF DESCRIPTION OF THE DRAWINGS

FIG. 13 is a rear view of the transfer conduit of FIG. 12.

FIG. 14 is a side, cross-sectional view showing the passageway of the transfer conduit of FIG. 12.

FIG. 15 is a top view of the transfer conduit of FIG. 11.

DETAILED DESCRIPTION

Figure 1:
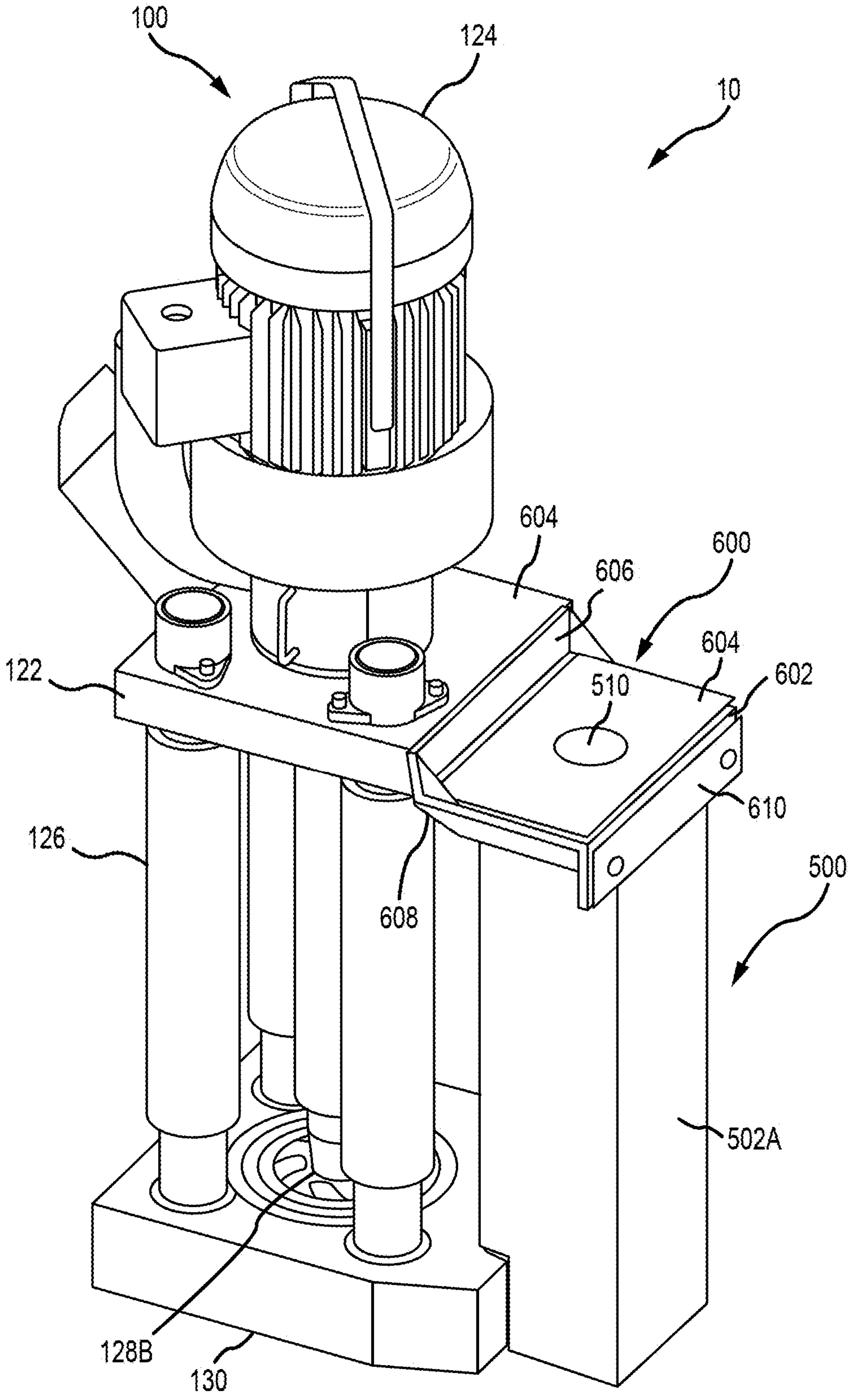
FIG. 1 is a side, perspective view of a device according to this disclosure, wherein the device is configured to be installed in a vessel designed to contain molten metal.

Turning now to the drawings, where the purpose is to describe a preferred embodiment of the invention and not to limit same, a device 10 includes a pump 100 and a metal-transfer conduit 500.

Pump

As seen, for example, in FIGS. 1-11, pump 100 is preferably a circulation pump and can be any type of circulation pump, or gas-release pump, satisfactory to move molten metal into the metal-transfer conduit as described herein. The structure of circulation pumps is known to those skilled in the art. The pump 100 preferably has a superstructure (or platform) 122, a drive source 124 (which is most preferably a pneumatic motor) mounted on the superstructure 122, support posts 126, a drive shaft 128, and a pump base 130. Motor 124 as shown is secured in part to platform 122 by a strap 125. Motor 124 preferably is partially surrounded by a cooling shroud 131, which is known in the art.

The support posts 126 connect the superstructure 122 to the pump base 130. The components of pump 100 that are immersed in molten metal, such as the pump base, support posts, rotor, and rotor shaft, are preferably comprised of graphite and/or ceramic.

Drive shaft 128 preferably includes a motor drive shaft 128A that extends downward from the motor 124, a rotor shaft 128B, and a coupling 128C. Drive shaft 128 is preferably comprised of steel. Rotor drive shaft 128B is preferably comprised of graphite, or graphite coated with a ceramic. Coupling 128C is preferably comprised of steel and connects the motor drive shaft 128A to the rotor drive shaft 128B.

The pump base 130 includes a first side 130A, a second side 130B, a third side 130C, and a fourth side 140. Pump base 130 further includes an inlet 132 at the top of the pump base 130 (but an inlet may instead be in the bottom surface of base 130, or the base 130 may have an inlet in the top surface and bottom surface of the base), wherein the inlet 132 is an opening that leads to a pump chamber 134.

Pump chamber 134 is a cavity formed in the pump base 130. The pump chamber 134 is connected to a tangential discharge 136 that leads to a pump outlet 138, which is an opening in the side wall 140 of the pump base 130. As shown, the side wall 140 of the pump base 130 has an indentation 142 formed therein and the pump outlet 138 is positioned in the indentation 142. This configuration is shown, for example, FIGS. 2, 7 and 8.

Side 140 has a first outer recess 140A and a second outer recess 140B. Two legs 140C and 140D are formed on either side of indentation 142. As shown, indentation 142 is formed in the center of legs 140C and 140D with pump outlet 138 formed in the center of indentation 142. Any suitable location for indentation 142 and pump outlet 138, however, may be utilized.

The indentation 142 is configured to receive metal-transfer conduit 500 and to align the pump outlet 138 with a transfer inlet 506, as described further below. The indentation preferably has a depth D of about 1" to 3" and a length of about 8" to 14". Legs 140C and 140D have respective sides 142A and 142B, which may be chamfered inwards, such as at an angle of about 5°-30°, and most preferably about 7°. The purpose of the angled inner sides 142A, 142B is to assist in locating metal-transfer conduit 500 in indentation 142.

Figure 2:
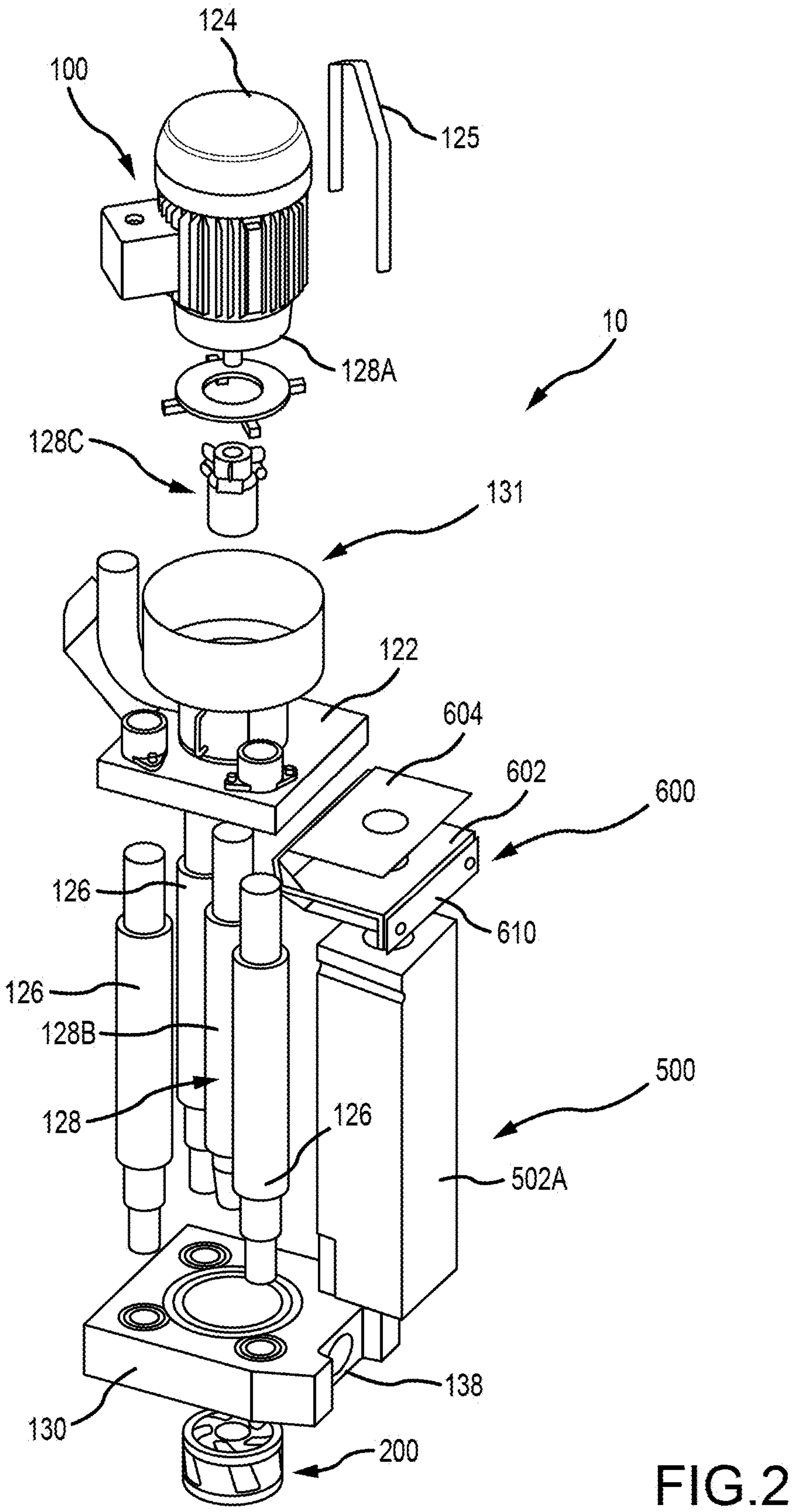
FIG. 2 is a side, perspective, exploded view of the device of FIG. 1.
Figure 3:
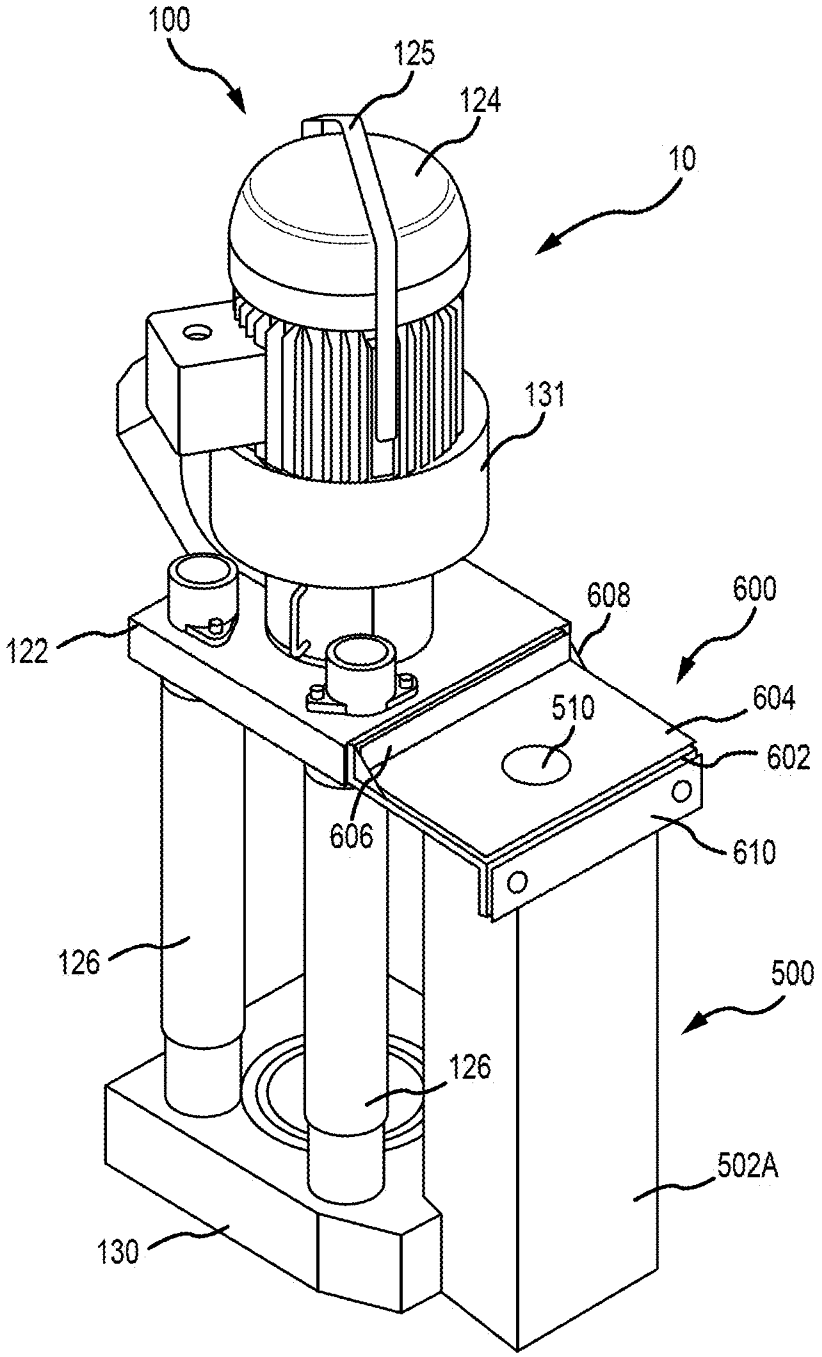
FIG. 3 is a front, perspective view of the device of FIG. 1.
Figure 6:
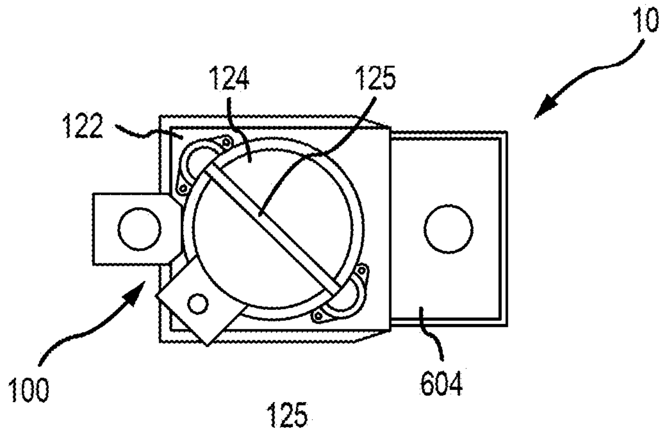
FIG. 6 is a top view of the device of FIG. 1.
Figure 4:
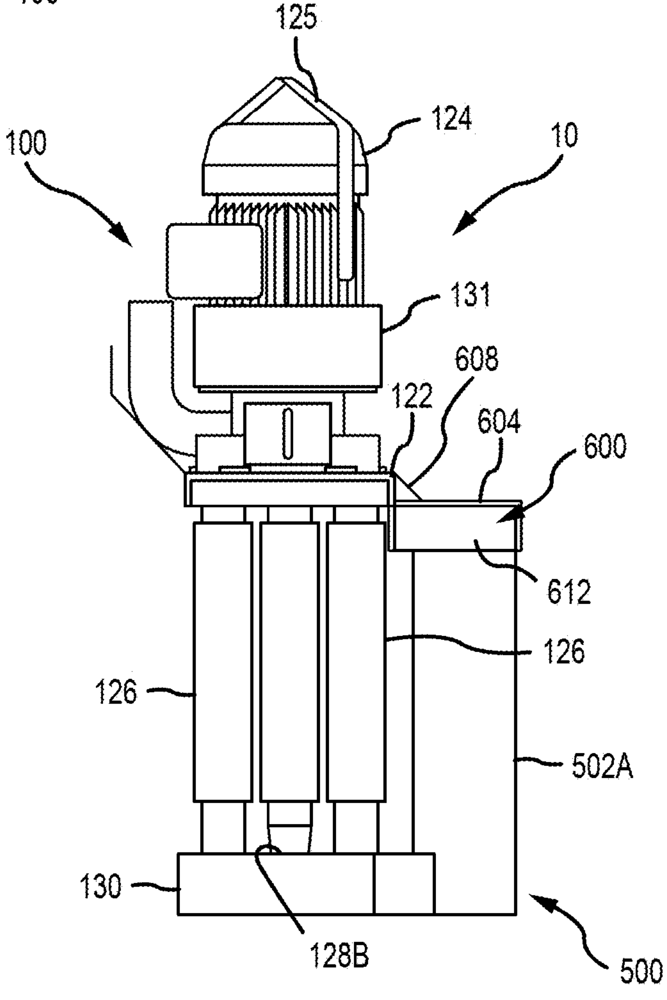
FIG. 4 is a side view of the device of FIG. 1.
Figure 5:
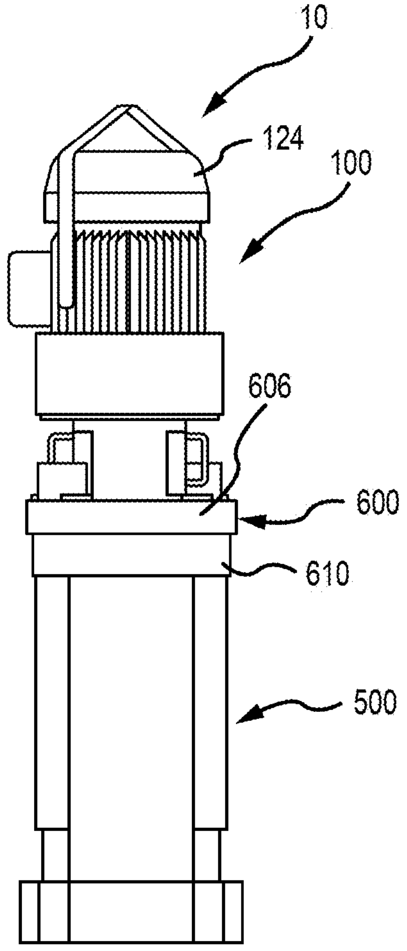
FIG. 5 is a front view of the device of FIG. 1.
Figure 7:
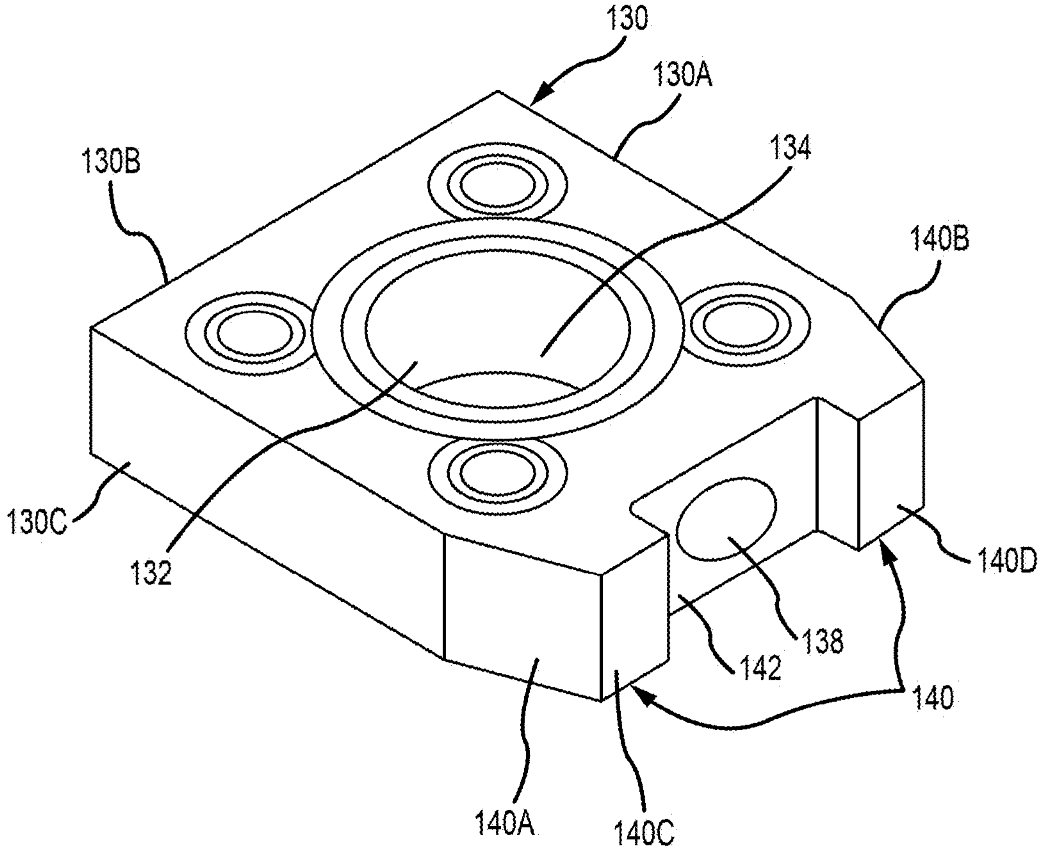
FIG. 7 is a perspective, side view of a pump base according to this disclosure.
Figure 8:
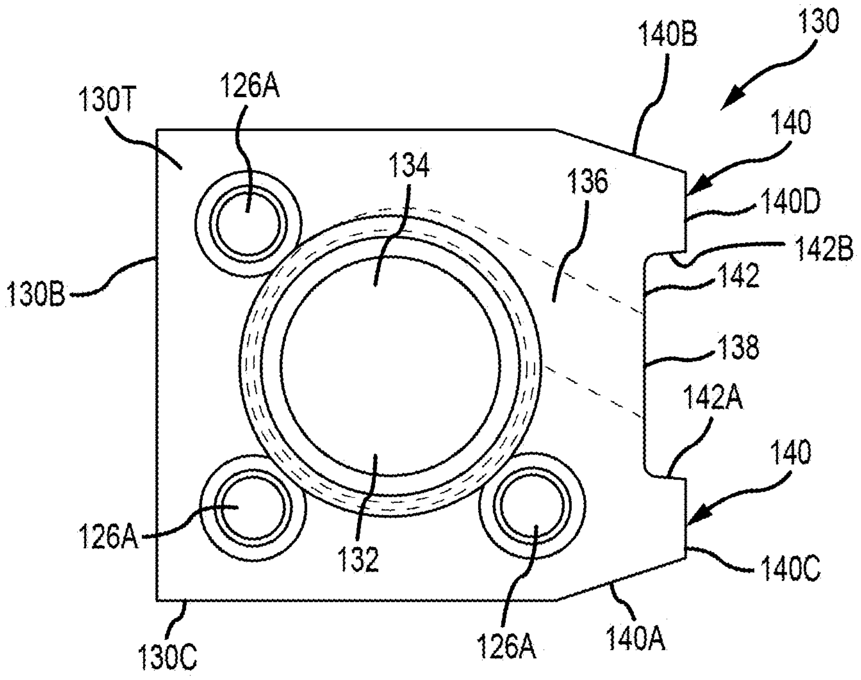
FIG. 8 is a top view of the pump base of FIG. 7.
Figure 9:
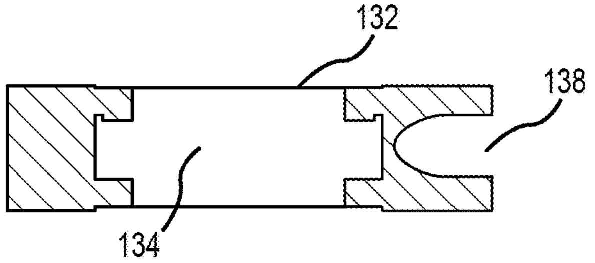
FIG. 9 is a cross-sectional view taken along line A-A of FIG. 8.
Figure 10:
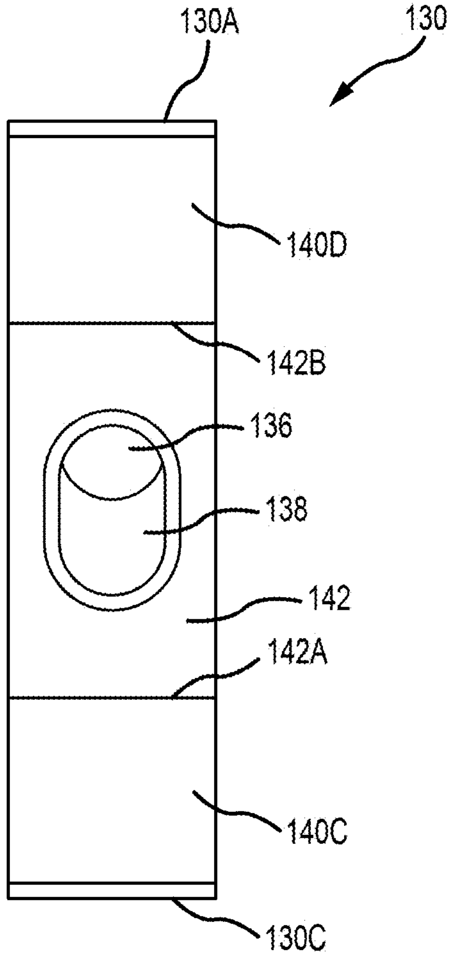
FIG. 10 is a front view of the pump base of FIG. 8.
Figure 11:
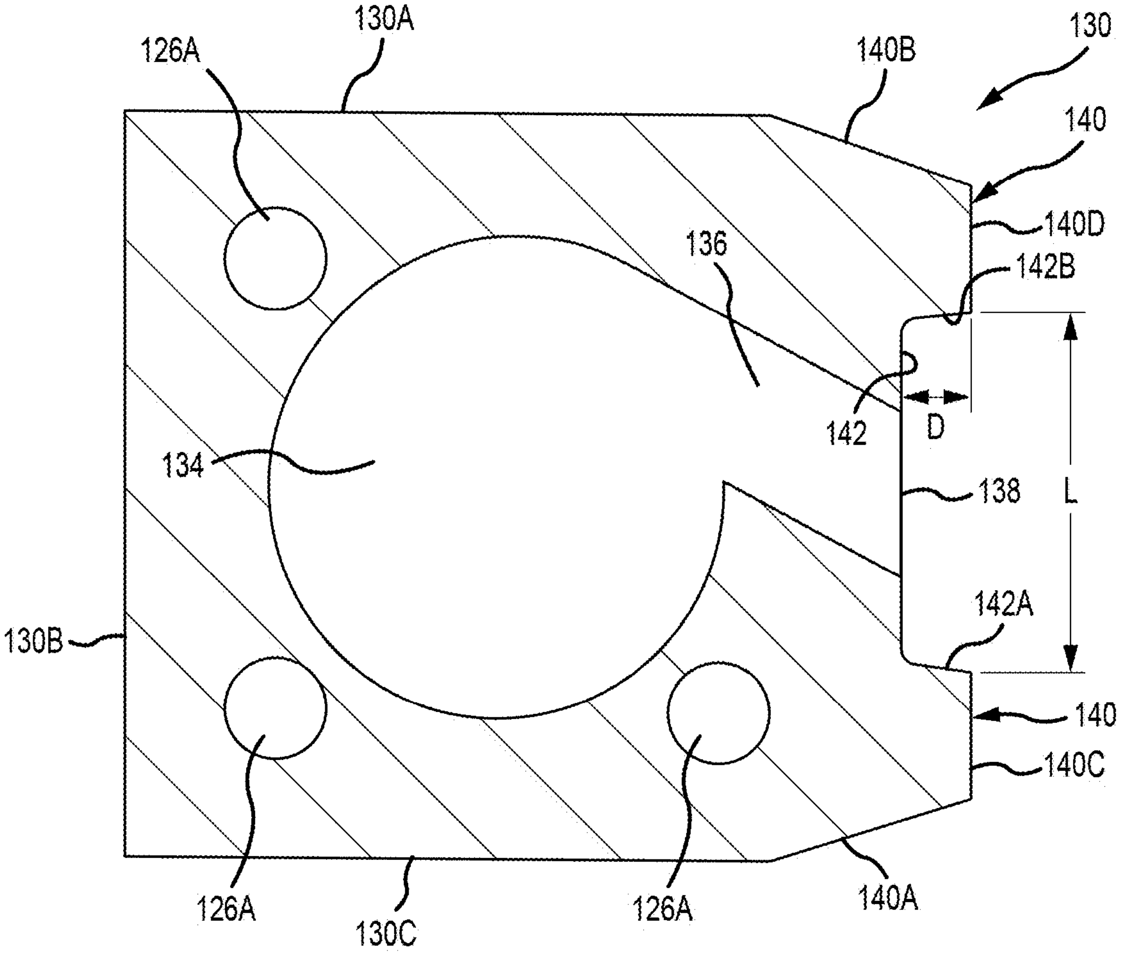
FIG. 11 is a cross-sectional view of taken along line D-D of FIG. 10.
Figure 12:
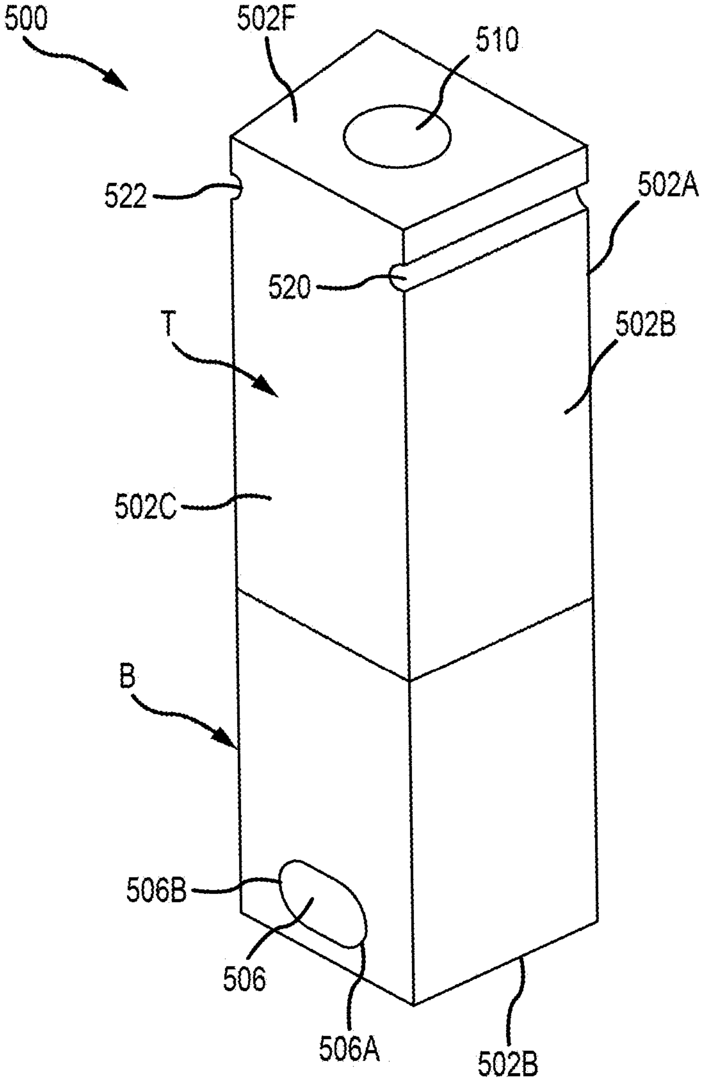
FIG. 12 is a perspective, rear view of a transfer conduit.
Figure 16:
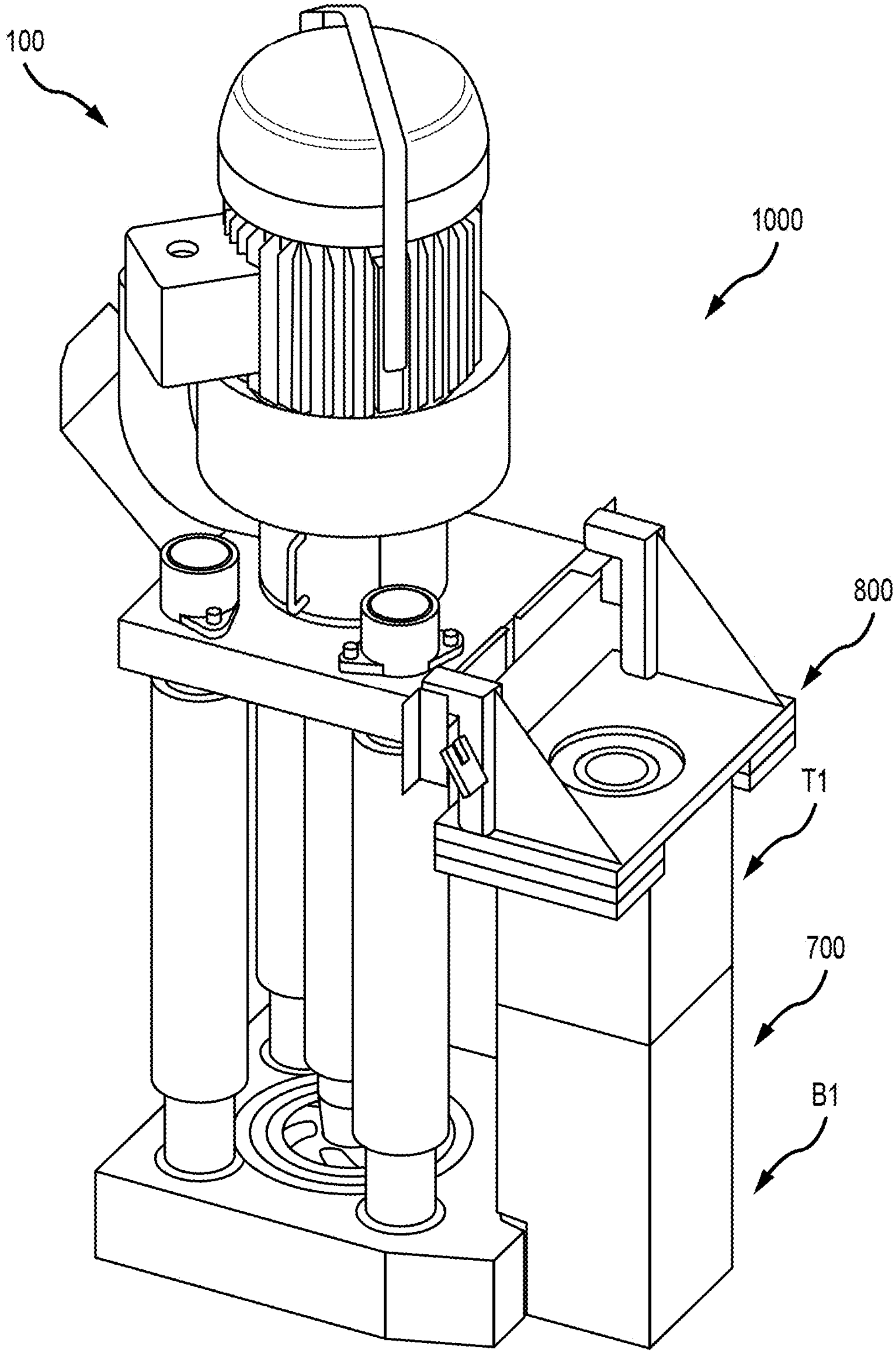
FIG. 16 is a perspective, side view of an alternate embodiment of a device according to this disclosure.
Figure 17:
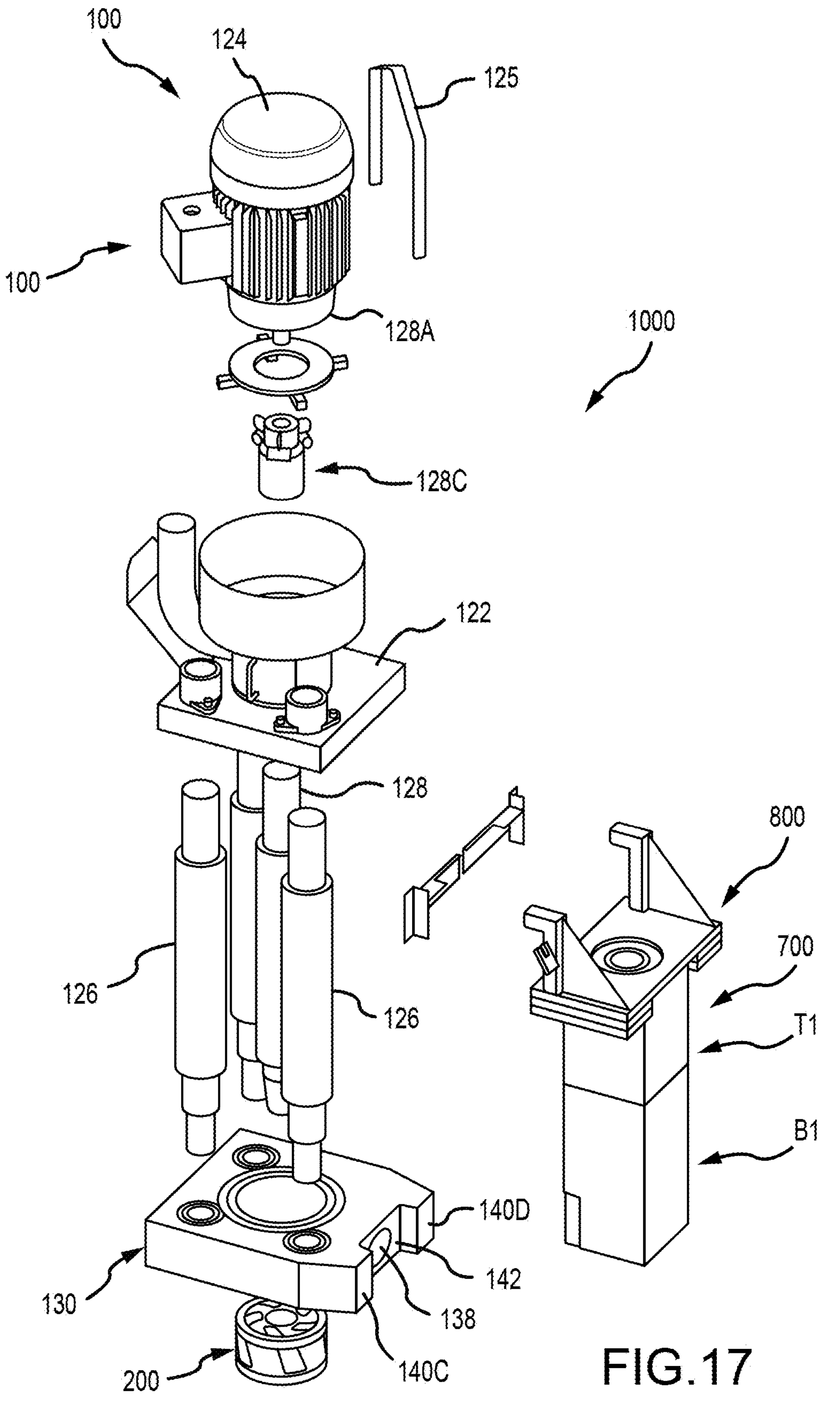
FIG. 17 is a side, perspective, exploded view of the device of FIG. 16.
Figure 19:
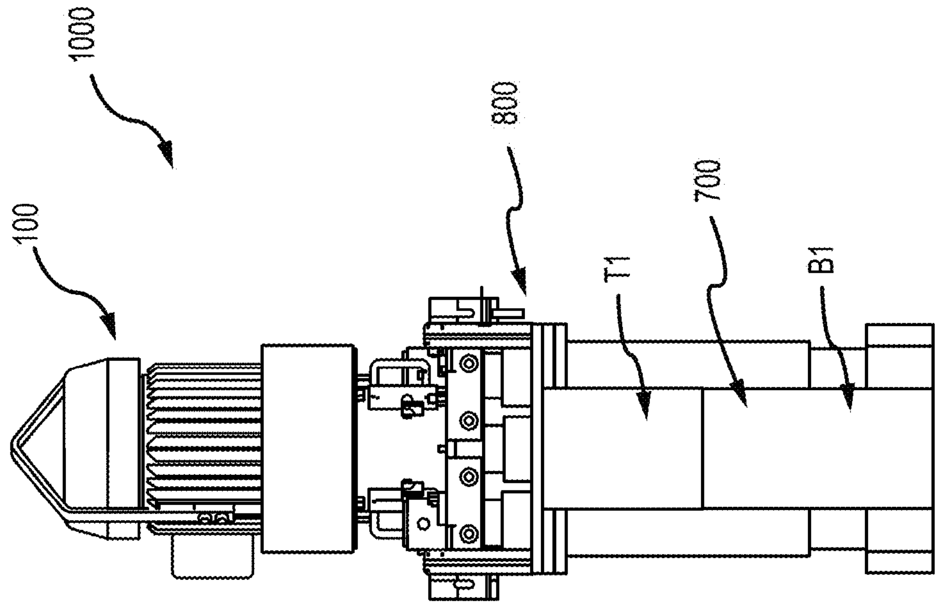
FIG. 19 is a front view of the device of FIG. 15.
Figure 18:
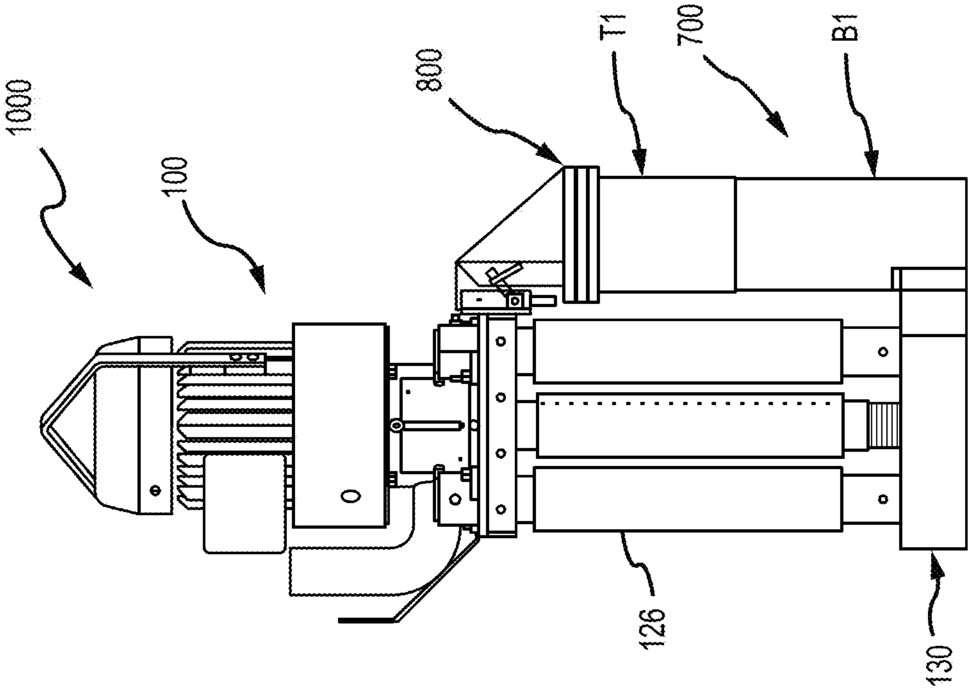
FIG. 18 is a side view of the device of FIG. 15.
Figure 20:
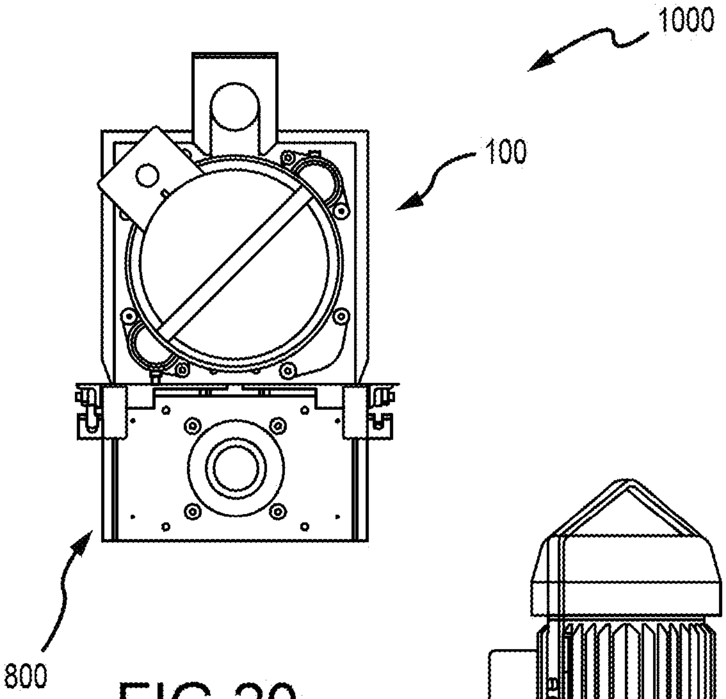
FIG. 20 is a top view of the device of FIG. 15.
Figure 21:
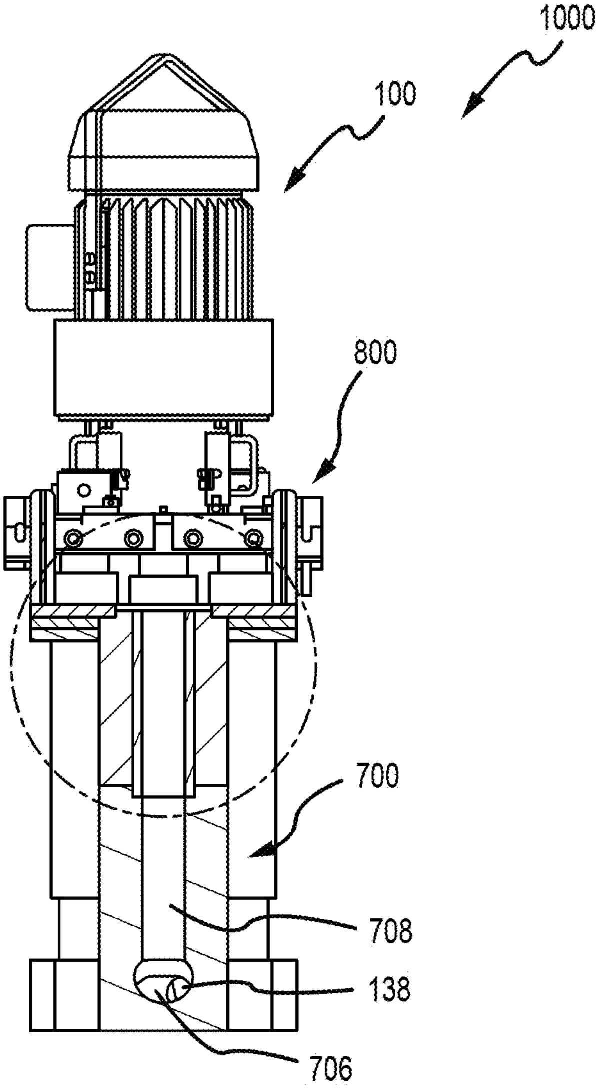
FIG. 21 is a partial, cross-sectional front view of the device of FIG. 20 taken along line B-B.
Figure 22:
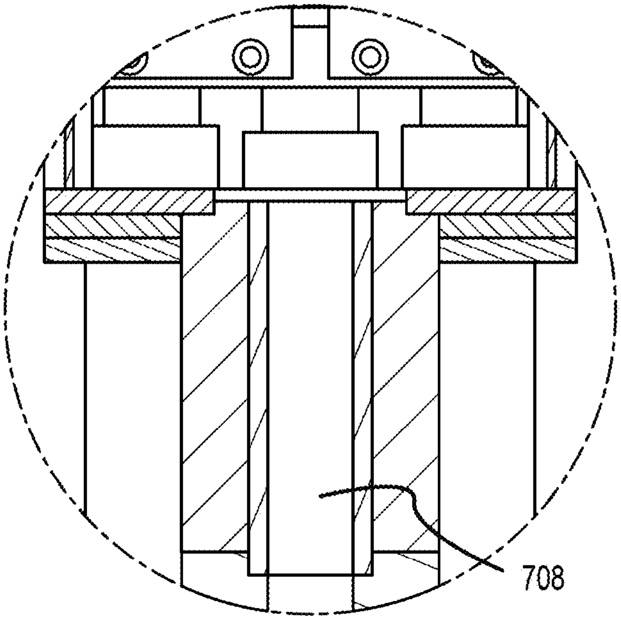
FIG. 22 is a close-up view of detail C of FIG. 21.
Figure 23:
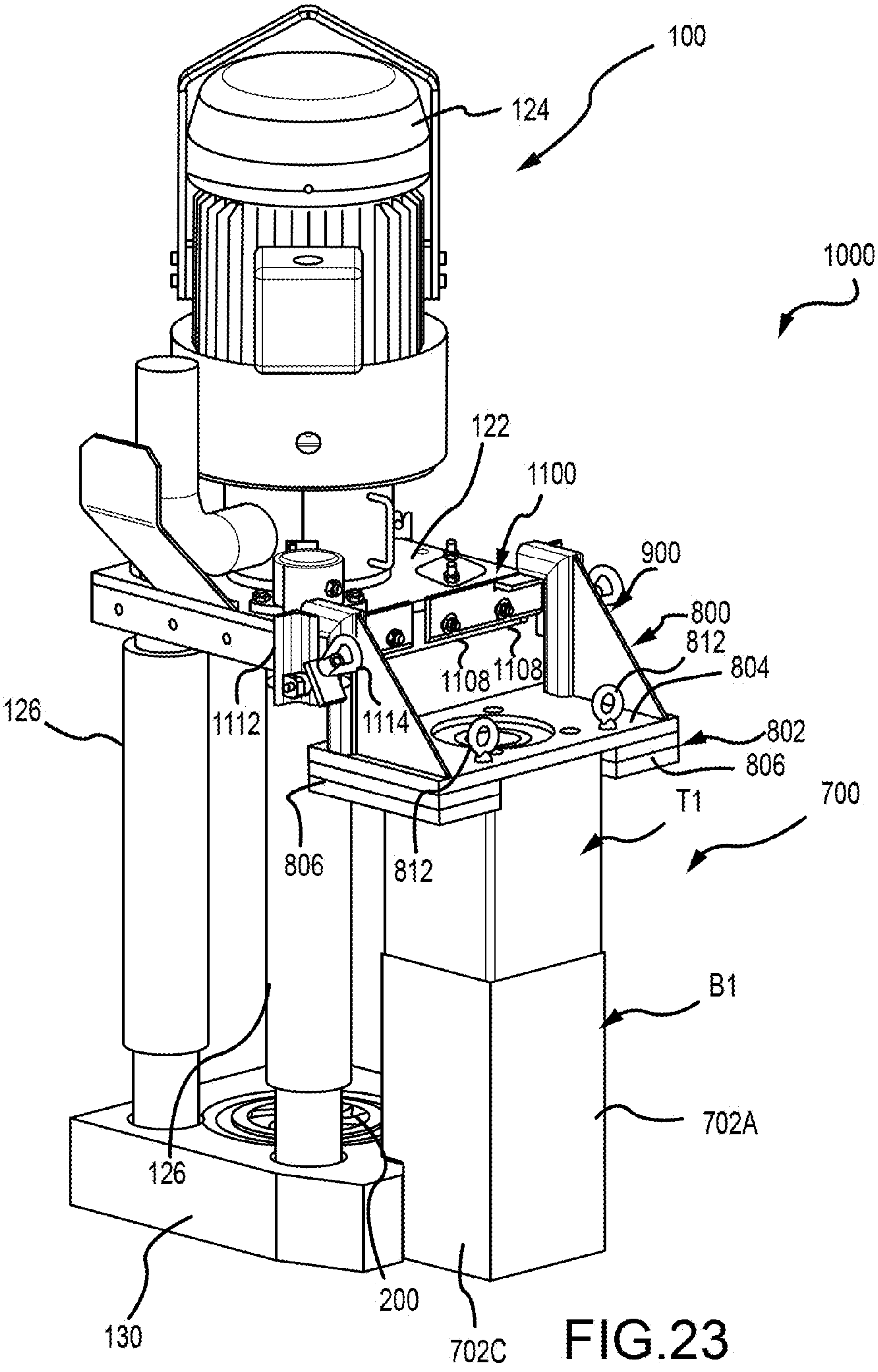
FIG. 23 is an enlarged, front, perspective view of the embodiment of FIG. 16.
Figure 24:
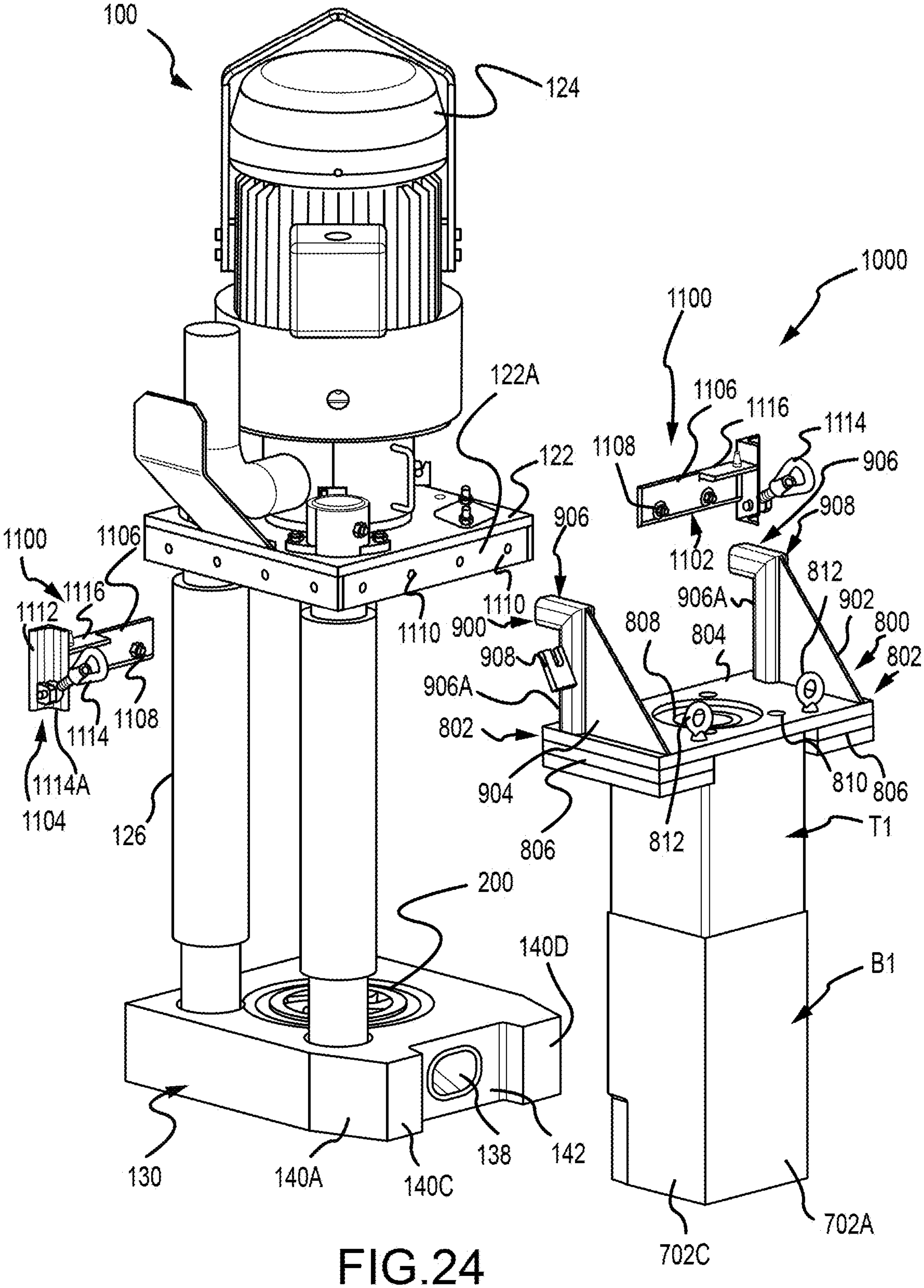
FIG. 24 is a partially exploded, front perspective view of the device of FIG. 23.
Figure 25:
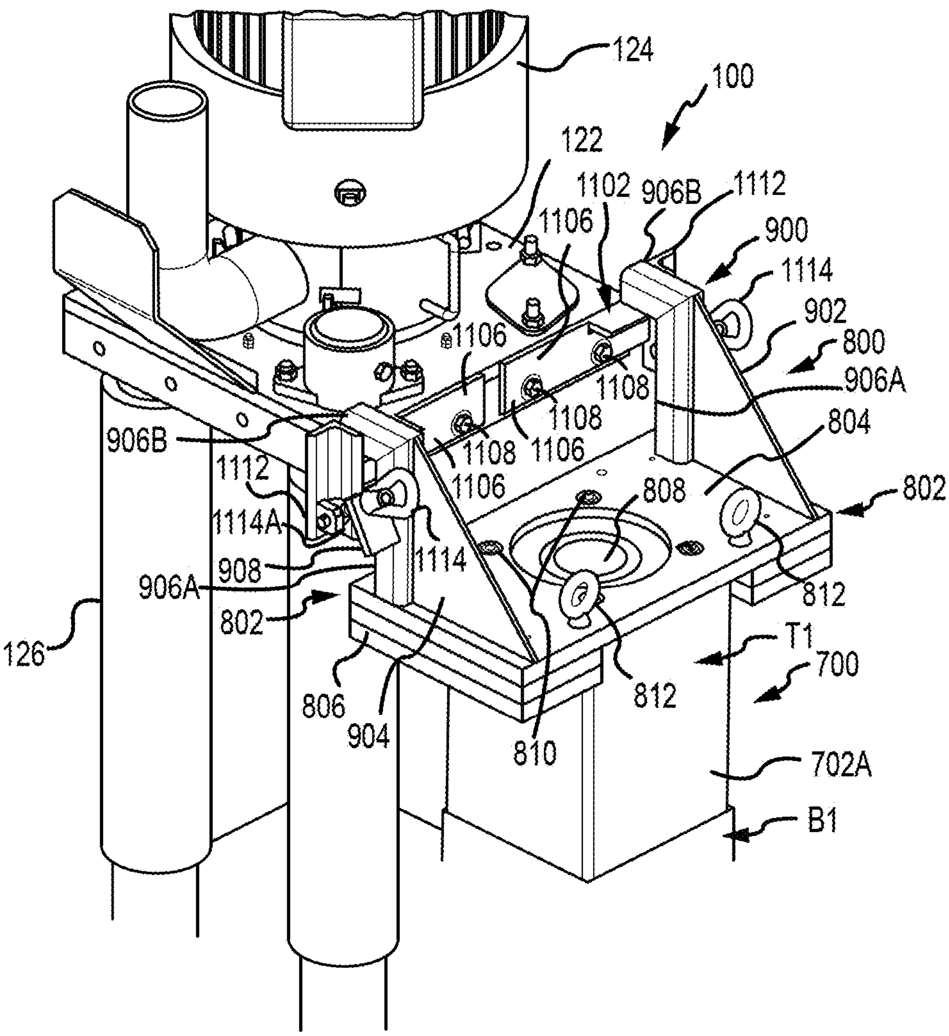
FIG. 25 is a close-up, partial, front, perspective view of the device of FIG. 23.
Figure 26:
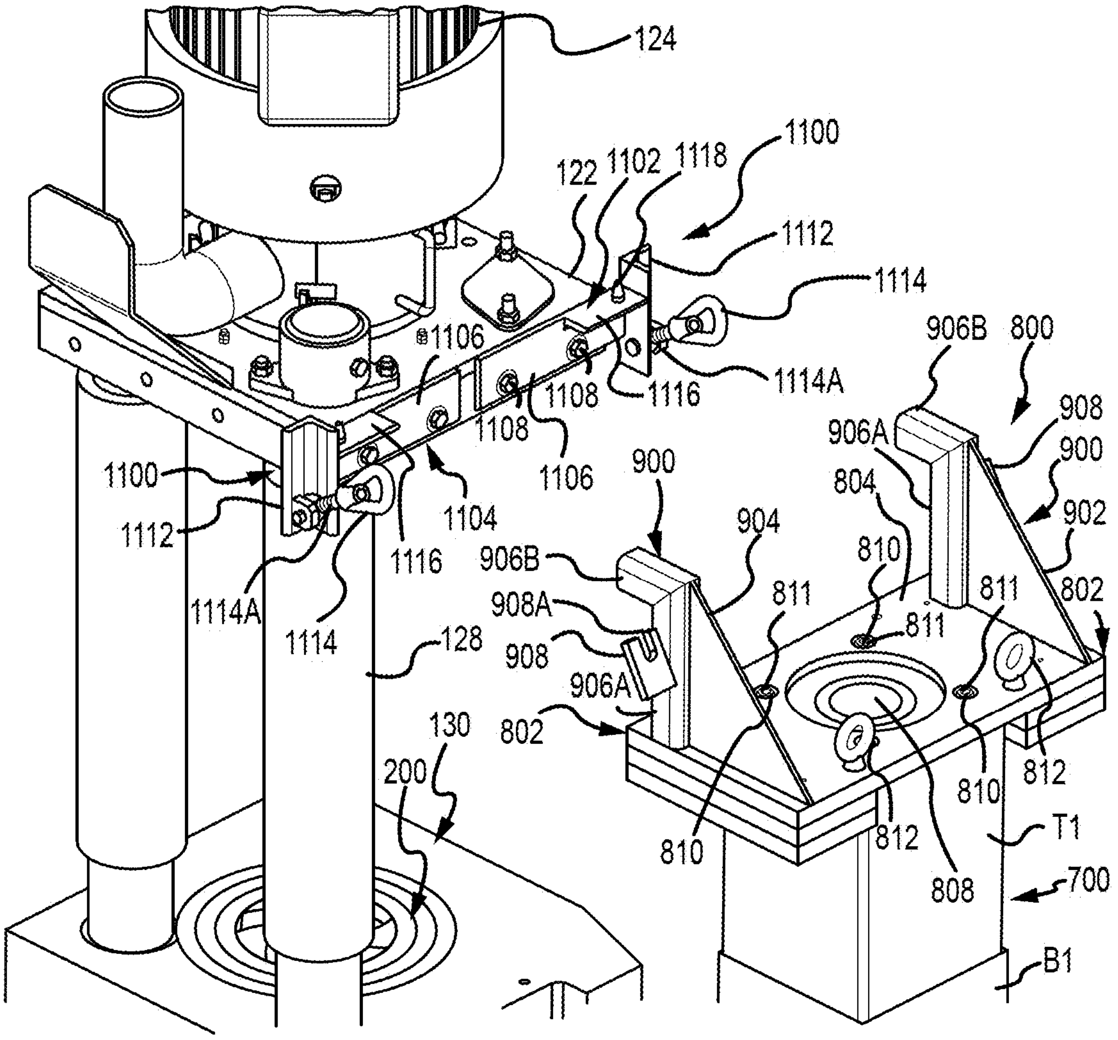
FIG. 26 is a close-up, partial, exploded view of the device of FIG. 23.
Figure 27:
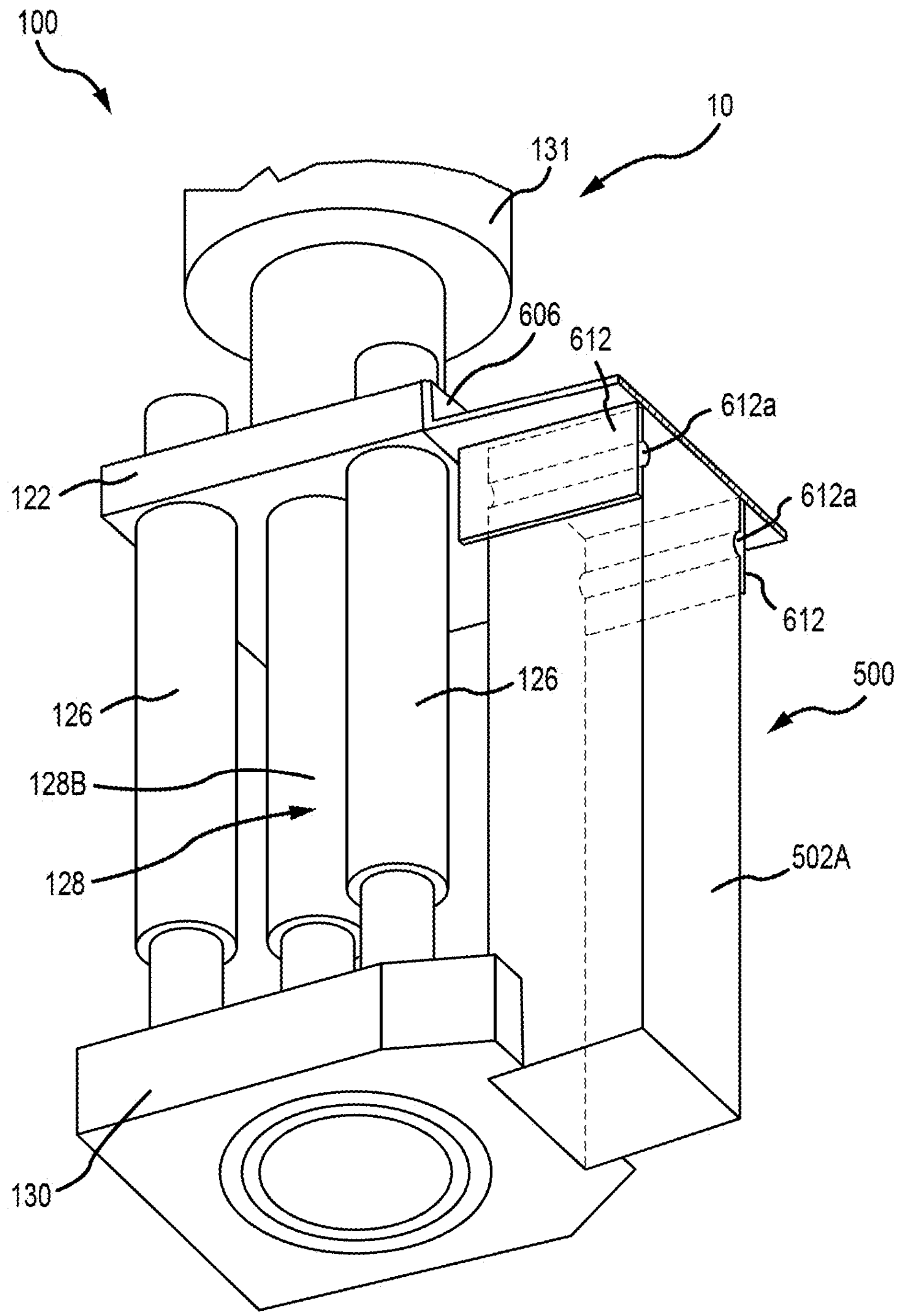
FIG. 27 is a close-up, partial, bottom exploded view of the device of FIG. 23.

A rotor 200, best seen in FIG. 2, is positioned in the pump chamber 132 and is connected to an end of the rotor shaft 128B that is opposite the coupling 128C.

In operation, the motor 124 rotates the drive shaft 128, which rotates the rotor 200. As the rotor (also called an impeller) 200 rotates, it moves molten metal out of the pump chamber 134, through the discharge 136, and through the pump outlet 138.

Metal-Transfer Conduit

A metal-transfer conduit 500 is an enclosed structure configured to be positioned in indentation 142 and may be connected to and entirely supported by pump 100. Metal-transfer conduit 500 as shown (and best seen in FIGS. 1-5 and 12-15) is a generally rectangular structure, but can be of any suitable shape or size, wherein the size depends on the size of the pump with which the metal-transfer conduit is used.

Metal-transfer conduit 500 is preferably comprised of material capable of withstanding the heat and corrosive environment of molten metal (particularly molten aluminum). Most preferably the heat resistant material is a high temperature, castable cement, with a high silicon carbide content, such as ones manufactured by AP Green or Harbison Walker, each of which are part of ANH Refractory, based at 400 Fairway Drive, Moon Township, PA 15108, or Allied Materials. Cement (if used) to connect metal-transfer conduit 500 to pump base 130 is of a type know by those skilled in the art, and is cast in a conventional manner.

In the embodiment shown, the metal-transfer conduit 500 has a bottom portion B and a top portion T. The bottom portion is preferably comprised of or consists of graphite because graphite is relatively inexpensive and simple to machine, which is helpful in obtaining dimensions sufficient for the bottom portion to be received in the indentation 142 and for the transfer inlet 506 to align with the pump outlet 138.

Metal-transfer conduit 500 as shown has four sides 502A, 502B, 502C and 502D, a bottom surface 502E a top surface 502F, a transfer inlet 506, a passage 508, and a transfer outlet 510. As best seen in FIG. 15, metal-transfer conduit 500 narrows moving from side 502A to side 502C, and sides 502B and 502D are formed at angles of about 5°-10°, or 7°, or 7⅛°, or 7.13°. The purpose of the narrowing configuration (if used) is to more easily position metal-transfer conduit 500 in indentation 142.

Transfer inlet 506 is formed in side 502C, preferably starting about 2"-6", or 1½"-3", from bottom surface 502E. Transfer inlet 506 can be of any suitable size and shape, and as shown has rounded sides 506A and 506B and a height of about 2"-4" (or about 3.25") and a width of about 4"-6" (or about 5"). Transfer inlet 506 may have the same size and dimensions of pump outlet 138 or it may have a cross-sectional area that is smaller or larger than the cross-sectional area of pump outlet 138. For example, the transfer inlet 506 may have a cross-sectional area that is 5%-10%, 10%-20%, 20%-30%, 30%-40%, 40%-50%, or any amount from 5%-50% larger or smaller than the cross-sectional area of pump outlet 138. The cross-sectional area of the pump outlet 138 is measured at the outer surface of indentation 142, and the cross-sectional area of transfer inlet 506 is measured at the outer surface of side 502C.

Transfer inlet 506 functions to allow molten metal to pass through it and into passage 508. Transfer inlet 506 may be configured to receive an extension (not shown) of base 130 of pump 100, wherein the pump outlet 138 is formed at the end of the extension.

Metal-transfer conduit 500 has a transfer outlet 510 formed in its top surface 512. Transfer outlet 510 is of any suitable size and shape to permit molten metal to move through it.

Pump base 130 and metal-transfer conduit 500 may also have structural features such as ridges, projections, grooves, or bores to assist in aligning metal-transfer conduit 500 with indentation 142 and pump outlet 138 with transfer inlet 506.

When aligned, pump outlet 138 and transfer inlet 506 are about 0-3" apart, or about 0-2" apart, or about ¼"-2" apart or 0½" apart. The pump outlet 138 and transfer inlet 506 are also preferably aligned vertically and horizontally so the respective centers of pump outlet and transfer inlet 506 are approximately aligned. By maintaining pump outlet 138 and transfer inlet 506 in close proximity, most molten metal from pump outlet 138 enters transfer inlet 506 when pump 100 is activated. Little pump speed or pressure is wasted, which helps the overall function of device 10.

Metal-transfer conduit 400 includes a groove 520 on side 502B and groove 522 on side 502B. Each groove terminates at side 502A and extends slightly (about ½"-1") onto side 502C. The purpose of grooves 520 and 522 is to connect to clamp 600 as described herein.

Clamp

Clamp 600 is preferably comprised of steel and has a first plate 602 that is configured to be positioned on top surface 502F of metal-transfer conduit 500 and be connected thereto by suitable fasteners. First plate 602 has an opening 602A that is configured to align with transfer outlet 510. Second plate 604 is connected to first plate 602 by hinges 608, so clamp can be folded from a first, contracted position, shown in FIG. 2 to a second, open position shown in FIGS. 1 and 3-6.

Second plate 604 is configured to be positioned on and be fastened to platform 122 by any suitable fasteners. A step-up section 606 further connects first plate 602 to second plate 604 and is preferable fastened to a side of platform 122 by any suitable fasteners.

Front plate 610 is connected to and extends downwards from first plate 602, and is connected to side 502A of metal-transfer conduit 500 by fasteners. Side portions 612 each have ridges 612*a* that mate, respectively, with grooves 520 and 522 to secure clamp 600 to metal-transfer conduit 500.

Operation

In operation, when the motor is activated, molten metal is pumped out of the pump outlet 138 through the transfer inlet 506, and into passage 508. Passage 508 fills with molten metal until the molten metal reaches the transfer outlet 510. Molten metal then exits transfer outlet 510. The transfer outlet 510 may be connected to a pipe, launder or other structure that further transfers the molten metal.

Alternate Embodiment

Another embodiment 100 of the invention is shown in FIGS. 16-22. This embodiment is the same as the one shown in FIGS. 1-15 except for a modification to the metal-transfer conduit and the clamp. The pump is previously-described pump 100.

Metal-Transfer Conduit

The metal-transfer conduit 700 is the same as previously described metal-transfer conduit 500 except that it is shorter as compared to the height of pump 100. Metal-transfer conduit 700 has a top portion T1 that is preferably comprised of ceramic, such as silicon dioxide, and a bottom portion D1 that is preferably comprised of graphite.

Clamp

Clamp 800 is for connecting metal-transfer conduit 700 to the superstructure 122 of pump 100, and to assist in aligning the transfer inlet of metal transfer conduit 700 with the pump outlet 138 of pump base 130. Clamp 800 has an attachment portion 802 and support portion 900. Attachment portion 802 has a mounting plate 804 and insulation 806.

Mounting plate 804 has an opening 808 that communicates with a transfer outlet formed in the top of metal-transfer conduit 700, and apertures 810 that receive fasteners 812 that are positioned through apertures 810 and received in bores (not shown) in the top surface of metal-transfer conduit 700. In this manner the attachment portion 802 and clamp 800 are attached to metal-transfer conduit 700, although any suitable attachment mechanism may be used.

Eyelets 812 are attached to mounting plate 804 and are used to lift or lower clamp 800 and metal-transfer conduit 700. Insulation 806 helps protect the metal mounting plate 804 from the heat of molten metal in the vessel in which device 100 is positioned. As shown, insulation 806 is formed of two insulating sheets of material, although any suitable structure may be utilized. Insulation 806 extends along the rear and both sides of metal-transfer conduit 700, but does not extend along the front of metal-transfer conduit 700, because mounting plate 804 does not extend past the front of metal-transfer conduit 700.

Support portion 900 includes two gussets 902, 904 that are preferably comprised of steel and are welded or otherwise connected to mounting plate 804. Connectors 906 are shown as formed of square tubing and are attached, such as by welding or other form of attachment, to each of gussets 902, 904. Each connector 906 has a substantially vertical section 906A and a substantially horizontal section 906B. Each connector 906 further includes an alignment plate 908 that includes a slot 908A.

A riser ledge assembly 1100 is configured to connect to support portion 900 of clamp 800 in order to connect the metal transfer conduit 700 to pump 100 and to support and properly position metal-transfer conduit 700 in indentation 142. Riser ledge assembly 1100 as shown has a first side 1102 and a second side 1104, although it could be one piece or more than two pieces. Each side 1102, 1104 has a fastening plate 1106 with apertures (not shown) that receive fasteners 1108 that are received in bores 1110 in edge 122A of platform (or superstructure) 122.

Each side 1102, 1104 also has a flange 1112 that is connected to a swivel bolt 1114, and a second flange 1116 with a projection 1118.

In operation, riser ledge assembly 1100 is connected to superstructure 122 by positioning sides 1102, 1104 on edge 122A, aligning fasteners 1108 with bores 1110 and positioning fasteners 1108 in bores 1110, such as by screwing the fasteners into the bores, or by positioning the fastener through the bores 1110 and securing them with nuts on the side edge 122A opposite riser ledge assembly 1100. Clamp 800 is positioned on metal-transfer conduit 700. Clamp 800, with riser tube 700 attached, is connected to riser ledge assembly 1100 by positioning connectors 906 over flanges 1116 and projections 1118, and projections 1118 are received in mating depressions (not shown) in connectors 906. The metal transfer conduit 700 swings into place in indentation 142 in base 130, and the slots 908A of alignment plate 908 are positioned against threaded rods 1114A of swivel bolts 1114. Openings 1110 are larger in diameter than the bodies of fasteners 1108, which allows for fasteners 1108 to be moved upwards or downwards or sideways, which alters the position of the metal-transfer conduit 700. In one embodiment, the vertical position and/or sideways position of metal-transfer conduit 700 can be adjusted by up to about ½" or up to about ¾".

Operation

Device 1000 operates in the same manner as previously described device 10.

NON-LIMITING EXAMPLES

Some non-limiting examples of this disclosure are as follows:

Example 1: A device for transferring molten metal, the device comprising:

(a) a pump configured for pumping molten metal, wherein the pump comprises (i) a pump base including a pump chamber, a pump outlet, a discharge extending from the pump chamber to the outlet, (ii) a rotor in the pump chamber, and (iii) a front side that includes an indentation, wherein the pump outlet is positioned in the indentation; and (b) a metal-transfer conduit having a top portion and a bottom portion, a transfer inlet, a transfer outlet, and a passage extending from the transfer inlet to the transfer outlet, wherein the bottom portion of the transfer conduit is positioned in the indentation and the transfer inlet is juxtaposed and in fluid communication with the pump outlet.

Example 2: The device of example 1, wherein the pump outlet is in the center of the indentation.

Example 3: The device of example 1 or 2, wherein the pump further includes a platform that supports a motor.

Example 4: The device of example 3, wherein the platform is attached to a clamp and the clamp is further attached to the top portion of the metal-transfer conduit.

Example 5: The device of any of examples 1-4, wherein the bottom portion of the metal-transfer conduit is comprised of graphite and the top portion of the transfer conduit is comprised of ceramic.

Example 6: The device of example 5, wherein the ceramic is silicon carbide.

Example 7: The device of example 5 or 6, wherein the bottom portion consists of graphite.

Example 8: The device of any of examples 5 or 6, wherein the top portion consists of ceramic.

Example 9: The device of any of examples 1-8, wherein the discharge is tangential to the pump chamber.

Example 10: The device of any of examples 1-10, wherein the transfer outlet is on a top surface of the transfer conduit.

Example 11: The device of any of examples 1-11, wherein the pump outlet has an outer cross-sectional area and the transfer inlet has an outer cross-sectional area.

Example 12: The device of example 11, wherein the cross-sectional area of the pump outlet is the same as the cross-sectional area of the transfer inlet.

Example 13: The device of example 11, wherein the cross-sectional area of the pump outlet is greater than the cross-sectional area of the transfer inlet.

Example 14: The device of example 11, wherein the cross-sectional area of the transfer inlet is greater than the cross-sectional area of the pump outlet.

Example 15: The device of any of examples 1-14, wherein the metal-transfer conduit is connected to the pump base.

Example 16: The device of example 15, wherein the metal-transfer conduit is cemented to the pump base.

Example 17: The device of any of examples 1-16, wherein a distance between the pump outlet and the transfer inlet is 2" or less.

Example 18: The device of any of examples 1-16, wherein a distance between the pump outlet and the transfer inlet is ½" or less.

Example 19: The device of any of examples 1-18, wherein the side of the pump base that includes the indentation has a first chamfered side and a second chamfered side.

Example 20: The device of example 19, wherein the first chamfered side and the second chamfered side are chamfered inwards by 5° to 20°.

Example 21: The device of any of examples 1-20, wherein the indentation has a depth of 1" to 4".

Example 22: The device of any of examples 1-21, wherein the indentation has a length of 8" to 14".

Example 23: The device of any of examples 1-22, wherein the indentation has a first, inner wall and a second, inner wall.

Example 24: The device of example 23, wherein the first, inner wall is angled inwards by 5° to 20° and the second, inner wall is angled inwards by 5° to 20°.

Example 25: The device of any of examples 1-24, wherein the pump outlet and the transfer inlet are vertically aligned.

Example 26: The device of any of examples 1-25, wherein the pump outlet and the transfer inlet are horizontally aligned.

Example 27: The device of any of examples 1-26, wherein the pump base further includes one or more locater structures configured to align the pump base with the metal-transfer conduit.

Example 28: The device of example 27, wherein the one or more locater structures are in the indentation.

Example 29: The device of any of examples 1-28, wherein the metal-transfer conduit has one or more locater structures configured to align the metal-transfer conduit with the pump base.

Example 30: The device of any of examples 1-29, wherein the metal-transfer conduit has a front surface having a first width, a second surface on which the transfer inlet is positioned, wherein the second surface has a second width, and the second width is less than the first width.

Example 31: The device of example 30, wherein the metal-transfer conduit has a two side surfaces that connect the first surface to the second surface, wherein each of the side surfaces are angled.

Example 32: The device of example 4, wherein the clamp has a first plate attached to a top surface of the metal transfer conduit and a second plate attached to the platform.

Example 33: The device of example 32, wherein the clamp further includes an opening in the first plate and the opening is aligned with the transfer outlet.

Example 34: The device of example 32 or 33, wherein the clamp further includes a step-up section that connects the first plate to the second plate.

Example 35: The device of example 34, wherein the step-up section is connected to a side of the platform.

Example 36: The device of any of examples 32-35, wherein the first plate and second plate are connected by hinges and the clamp is movable between a first, compressed position and a second, expanded position.

Example 37: The device of any of examples 4 or 32-36, wherein the metal transfer conduit has grooves in two sides and the clamp has side plates with ridges received in the grooves.

Some additional, non-limiting examples of this disclosure are as follows:

Example 1: A pump base for a molten metal pump, the pump base comprising:

(a) a pump chamber configured to house a rotor, a pump outlet in one side of the base, and a discharge extending from the pump chamber to the pump outlet, and (b) a front side that includes an indentation configured to receive a metal-transfer conduit, wherein the pump outlet is positioned in the indentation.

Example 2: The device of example 1, wherein the outlet is in the center of the indentation.

Example 3: The device of example 1 or 2, wherein the pump further includes a platform that supports a motor.

Example 4: The device of example 3, wherein the platform is configured to attach to the top portion of the transfer conduit.

Example 5: The device of any of examples 1-4, wherein the discharge is tangential to the pump chamber.

Example 6: The device of any of examples 1-11, wherein the pump outlet has an outer cross-sectional area and the transfer inlet has an outer cross-sectional area.

Example 7: The device of any of examples 1-18, wherein the front side of the pump base has a first chamfered side and a second chamfered side.

Example 8: The device of example 19, wherein the first chamfered side and the second chamfered side are chamfered inwards by 5° to 20°.

Example 9: The device of any of examples 1-20, wherein the indentation has a depth of 1" to 4".

Example 10: The device of any of examples 1-21, wherein the indentation has a length of 8" to 14".

Example 11: The device of any of examples 1-22, wherein the indentation has a first, inner wall and a second, inner wall.

Example 12: The device of example 23, wherein the first, inner wall is angled inwards by 5° to 20° and the second, inner wall is angled inwards by 5° to 20°.

Some additional, non-limiting examples of this disclosure are as follows:

Example 1: A transfer conduit for use with a molten metal pump, the transfer conduit comprising: a top portion and a bottom portion, a transfer inlet, a transfer outlet, and a passage extending from the transfer inlet to the transfer outlet, wherein the bottom portion of the transfer conduit is positioned in the indentation and the transfer inlet is juxtaposed and in fluid communication with the outlet.

Example 2: The device of example 1, wherein the bottom portion of the transfer conduit is comprised of graphite and the top portion of the transfer conduit is comprised of ceramic.

Example 3: The device of example 2, wherein the ceramic is silicon carbide.

Example 4: The device of example 2 or 3, wherein the bottom portion consists of graphite.

Example 5: The device of any of examples 2 or 3, wherein the top portion consists of ceramic.

Example 6: The device of any of examples 1-5, wherein the transfer outlet is in a top surface of the transfer conduit.

Having thus described some embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired result.

What is claimed is:

1. A device for transferring molten metal, the device comprising:

(a) a pump configured for pumping the molten metal, wherein the pump comprises (i) a pump base including a pump chamber, a pump outlet, and a discharge extending from the pump chamber to the pump outlet, (ii) a rotor in the pump chamber, (iii) a front side that includes an indentation, wherein the pump outlet is positioned in the indentation, (iv) a platform configured to support a motor, and (v) a clamp attached to the platform, wherein the clamp has side plates with ridges; and (b) a metal-transfer conduit having (i) a top portion and a bottom portion, (ii) a transfer inlet and a transfer outlet, (iii) a passage extending from the transfer inlet to the transfer outlet, (iv) a plurality of sides, (v) grooves in two of the plurality of sides, wherein the clamp is attached to the top portion and the ridges are received in the grooves, and wherein the bottom portion of the transfer conduit is positioned in the indentation and the transfer inlet is juxtaposed and in fluid communication with the pump outlet.

2. The device of claim 1, wherein the pump outlet is in the center of the indentation.

3. The device of claim 1, wherein the bottom portion of the metal-transfer conduit is comprised of graphite and the top portion of the transfer conduit is comprised of ceramic.

4. The device of claim 1, wherein the discharge is tangential to the pump chamber.

5. The device of claim 1, wherein the transfer outlet is on a top surface of the transfer conduit.

6. The device of claim 1, wherein the metal-transfer conduit is connected to the pump base.

7. The device of claim 1, wherein a distance between the pump outlet and the transfer inlet is 2" or less.

8. The device of claim 1, wherein a distance between the pump outlet and the transfer inlet is ½" or less.

9. The device of claim 1, wherein the front side of the pump base has a first chamfered outer side and a second chamfered outer side.

10. The device of claim 1, wherein the indentation has a first, inner wall and a second, inner wall, wherein the first, inner wall is angled inwards by 5° to 20° and the second, inner wall is angled inwards by 5° to 20°.

11. The device of claim 1, wherein the pump outlet and the transfer inlet are vertically aligned.

12. The device of claim 1, wherein the pump outlet and the transfer inlet are horizontally aligned.

13. The device of claim 1, wherein the clamp has a first plate attached to a top surface of the metal transfer conduit and a second plate attached to the platform.

14. The device of claim 13 that further comprises a front plate connected to the first plate and connected to one of the plurality of sides of the metal transfer conduit.

15. The device of claim 13, wherein the clamp further includes a step-up section between the first plate and the second plate, wherein the step-up section is connected to a side of the platform.

16. The device of claim 1, wherein the pump outlet has an outer cross-sectional area and the transfer inlet has an outer cross-sectional area and the cross-sectional area of the pump outlet is either (a) the same as the cross-sectional area of the transfer inlet, or (b) greater than the cross-sectional area of the transfer inlet.

17. The device of claim 1, wherein the indentation has a depth of 1" to 4".

18. The device of claim 1, wherein the indentation has a length of 8" to 14".

19. The device of claim 1, wherein the pump base further includes one or more locater structures configured to align the pump outlet with the transfer inlet.

20. The device of claim 13, wherein the first plate and second plate are connected by hinges and the clamp is movable between a first, compressed position and a second, expanded position.

* * * * *